United States Patent
Fukushima

(10) Patent No.: US 10,338,744 B2
(45) Date of Patent: Jul. 2, 2019

(54) DISPLAY APPARATUS WITH A TOUCH DETECTION FUNCTION

(71) Applicant: Japan Display Inc., Tokyo (JP)

(72) Inventor: Toshiaki Fukushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 81 days.

(21) Appl. No.: 15/683,370

(22) Filed: Aug. 22, 2017

(65) Prior Publication Data

US 2018/0059871 A1    Mar. 1, 2018

(30) Foreign Application Priority Data

Aug. 23, 2016   (JP) ................................. 2016-163092

(51) Int. Cl.

| G06F 3/041 | (2006.01) |
|---|---|
| G06F 3/044 | (2006.01) |
| G06F 3/047 | (2006.01) |
| G02F 1/1333 | (2006.01) |
| G02F 1/1343 | (2006.01) |
| G02F 1/1362 | (2006.01) |

(52) U.S. Cl.
CPC ............ *G06F 3/0418* (2013.01); *G06F 3/044* (2013.01); *G06F 3/047* (2013.01); *G06F 3/0412* (2013.01); *G06F 3/0414* (2013.01); *G06F 3/0416* (2013.01); *G02F 1/13338* (2013.01); *G02F 1/134309* (2013.01); *G02F 1/136286* (2013.01); *G02F 2001/134345* (2013.01); *G02F 2201/121* (2013.01); *G02F 2201/123* (2013.01); *G06F 2203/04107* (2013.01); *G06F 2203/04108* (2013.01)

(58) Field of Classification Search
CPC .... G06F 3/0414; G06F 3/0416; G06F 3/0418; G06F 3/044
See application file for complete search history.

(56) References Cited

U.S. PATENT DOCUMENTS

| 2014/0192019 A1* | 7/2014 | Fukushima | G06F 3/0412 |
|---|---|---|---|
| | | | 345/174 |
| 2017/0322657 A1* | 11/2017 | Wang | G06F 3/0414 |

FOREIGN PATENT DOCUMENTS

JP    2000-066837 A    3/2000

* cited by examiner

*Primary Examiner* — Laurence J Lee
(74) *Attorney, Agent, or Firm* — K&L Gates LLP

(57) ABSTRACT

According to an aspect, a display apparatus includes: a plurality of gate lines; a plurality of first switches arranged in respective pixels in a display region; a plurality of second switches arranged in a frame region surrounding the display region; a first wire coupled to the respective second switches and supplying a detection drive signal to the respective gate lines through the respective second switches in a detection operation period; a third switch arranged in the frame region and coupled to the first wire; and a second wire coupled to the third switch and supplied with an off-state voltage, wherein the first wire is arranged between the second switches and the display region and the off-state voltage of the first switches is supplied to the first wire in a display operation period different from the detection operation period.

7 Claims, 22 Drawing Sheets

DISPLAY APPARATUS WITH A TOUCH DETECTION FUNCTION

CROSS-REFERENCE TO RELATED APPLICATIONS

This application claims priority from Japanese Application No. 2016-163092, filed on Aug. 23, 2016, the contents of which are incorporated by reference herein in its entirety.

BACKGROUND

1. Technical Field

The present invention relates to a display apparatus capable of touch detection and force detection.

2. Description of the Related Art

In recent years, touch detection apparatuses capable of detecting an external proximity object, or so-called touch panels, have attracted attention. A touch panel is mounted on or integrated with a display apparatus such as a liquid crystal display apparatus, so as to be used as a display apparatus with a touch detection function. A display apparatus including a capacitive touch sensor is known as such a display apparatus with a touch detection function. Also known is a display apparatus capable of detecting force and executing various functions in accordance with the magnitude of the force when an input surface thereof is pressed with a finger or the like.

Japanese Patent Application Laid-open Publication No. 2000-066837 (JP-A-2000-066837) discloses a force detecting digitizer including a liquid crystal display cell, and a gate line and a drain line arranged so as to intersect with each other. The force detecting digitizer disclosed in JP-A-2000-066837 detects force applied to a liquid crystal panel by change of a capacitance of the liquid crystal display cell provided in an intersection of the gate line and the drain line.

In some cases, a large parasitic capacitance is generated in a self-capacitive detection operation.

For the foregoing reasons, there is a need for a display apparatus capable of reducing a parasitic capacitance in the self-capacitive detection operation.

SUMMARY

According to an aspect, a display apparatus includes: a plurality of gate lines; a plurality of first switches arranged in respective pixels in a display region, each of the first switches being coupled to one of the gate lines; a plurality of second switches arranged in a frame region surrounding the display region, each of the second switches being coupled to one of the gate lines; and a first wire coupled to the respective second switches and supplying a detection drive signal to the respective gate lines through the respective second switches in a detection operation period. The first wire is arranged between the second switches and the display region.

DETAILED DESCRIPTION

Figure 1:
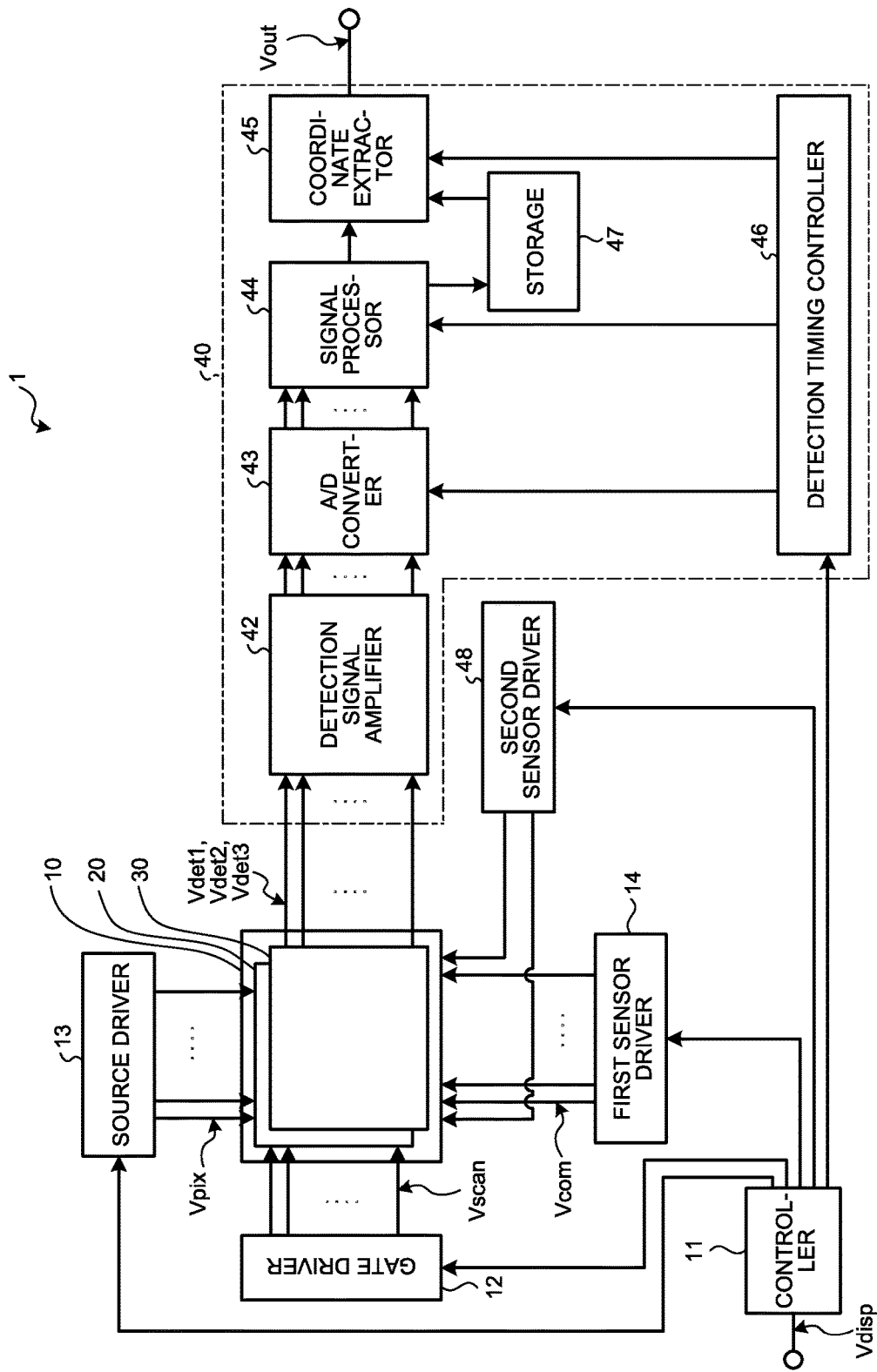
FIG. 1 is a block diagram illustrating an exemplary configuration of a display apparatus with a touch detection function according to a first embodiment.

Modes (embodiments) for carrying out the present invention will be described in detail with reference to the drawings. The present invention is not limited by the descriptions of the following embodiments. The elements described hereunder include those that can be easily thought of by those skilled in the art and substantially the same elements. The elements described hereunder may also be combined as appropriate. The disclosure is merely an example, and the present invention naturally encompasses appropriate modifications maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same elements as those described in the drawings that have already been discussed are denoted by the same reference numerals throughout the description and the drawings, and detailed description thereof will not be repeated in some cases. In this disclosure, when an element is described as being "on" another element, the element can be directly on the other element, or there can be one or more elements between the element and the other element.

First Embodiment

FIG. 1 is a block diagram illustrating an exemplary configuration of a display apparatus with a touch detection function according to a first embodiment. As illustrated in FIG. 1, a display apparatus 1 with a touch detection function includes a display device 10 with a touch detection function, a controller 11, a gate driver 12, a source driver 13, a first sensor driver 14, and a detector 40. The display apparatus 1 with a touch detection function is a display apparatus in which the display device 10 with a touch detection function has a touch detection function built therein. The display device 10 with a touch detection function is a device in which a display panel 20 using a liquid crystal display element as a display element and a touch panel 30 as an input detection device that detects a touch input are integrated. The display device 10 with a touch detection function may be a so-called on-cell type device in which the touch panel 30 is mounted on the display panel 20. The display panel 20 may be, for example, an organic electroluminescence (EL) display panel.

The display panel 20 is an element that performs display by sequentially scanning each one horizontal line in accordance with a scanning signal Vscan supplied from the gate driver 12, which will be described below. The controller 11 is a circuit that supplies control signals to the gate driver 12, the source driver 13, the first sensor driver 14, and the detector 40, in accordance with a video signal Vdisp supplied from the outside, and controls them to operate in synchronization with one another.

The gate driver 12 has a function to sequentially select one horizontal line that serves as a target of display drive for the display device 10 with a touch detection function, in accordance with a control signal supplied from the controller 11.

The source driver 13 is a circuit that supplies a pixel signal Vpix to each sub-pixel SPix, which will be described below, of the display device 10 with a touch detection function, in accordance with a control signal supplied from the controller 11.

The first sensor driver 14 is a circuit that supplies a detection drive signal Vcom to a first sensor electrode COML, which will be described below, of the display device 10 with a touch detection function, in accordance with a control signal supplied from the controller 11.

The touch panel 30 detects contact or proximity of an external conductor with or to a display region by operating on the basis of the basic principle of capacitive touch detection, and performing a touch detection operation by a mutual capacitive method. The touch panel 30 may perform a touch detection operation by a self-capacitive method. The touch panel 30 performs a force detection operation by the self-capacitive method.

The detector 40 is a circuit that detects whether there is a touch on the touch panel 30, in accordance with a control signal supplied from the controller 11 and a first detection signal Vdet1 supplied from the touch panel 30. When there is a touch, the detector 40 obtains the coordinates and the like of the touch input. The detector 40 includes a detection signal amplifier 42, an analog/digital (A/D) converter 43, a signal processor 44, a coordinate extractor 45, and a storage 47. A detection timing controller 46 controls the A/D converter 43, the signal processor 44, and the coordinate extractor 45 to operate in synchronization with one another, in accordance with a control signal supplied from the controller 11.

Further, a second sensor driver 48 is a selection circuit for gate lines 23, which will be described below, for supplying a detection drive signal Vd or a guard signal Vsg1 to the gate lines 23, when detecting force applied to the display device 10 with a touch detection function. The detector 40 detects the force applied to the display device 10 with a touch detection function, in accordance with a second detection signal Vdet2 and a third detection signal Vdet3 supplied from the touch panel 30.

Figure 2:
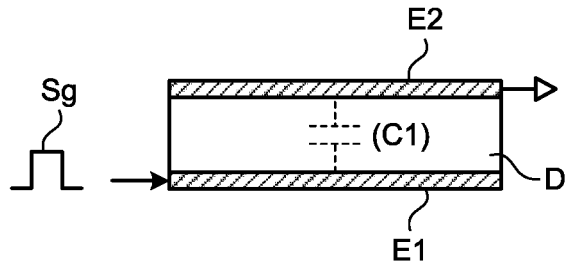
FIG. 2 is an explanatory diagram illustrating a state in which a finger is neither in contact with nor in proximity to a display apparatus, for explaining the basic principle of mutual capacitive touch detection.
Figure 3:
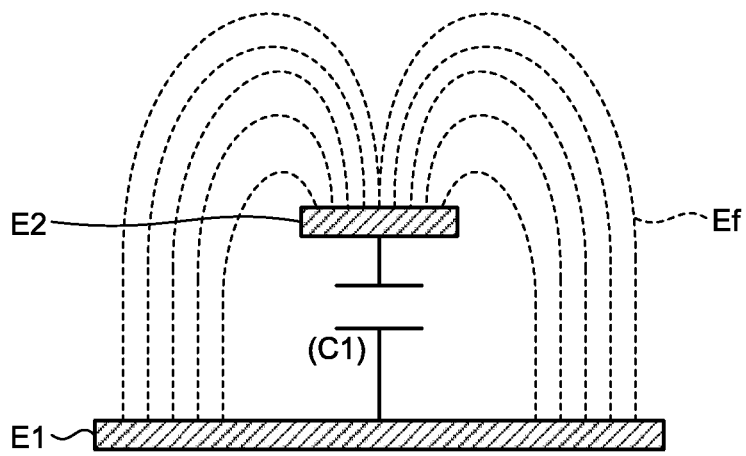
FIG. 3 is an explanatory diagram illustrating an example of a fringe electric field in the state in which the finger is neither in contact with nor in proximity to the display apparatus as illustrated in FIG. 2.
Figure 4:
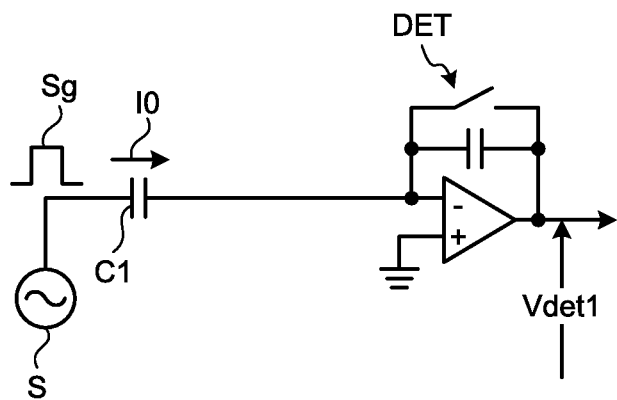
FIG. 4 is an explanatory diagram illustrating an example of an equivalent circuit in the state in which the finger is neither in contact with nor in proximity to the display apparatus as illustrated in FIG. 2.
Figure 5:
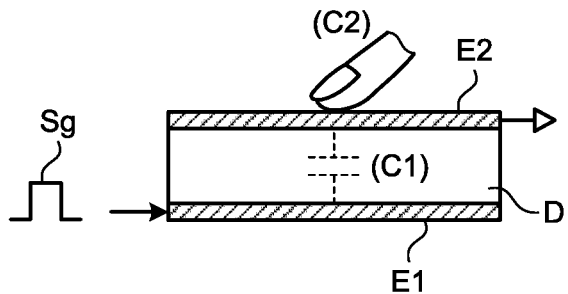
FIG. 5 is an explanatory diagram illustrating a state in which a finger is in contact with or in proximity to a display apparatus, for explaining the basic principle of mutual capacitive touch detection.
Figure 6:
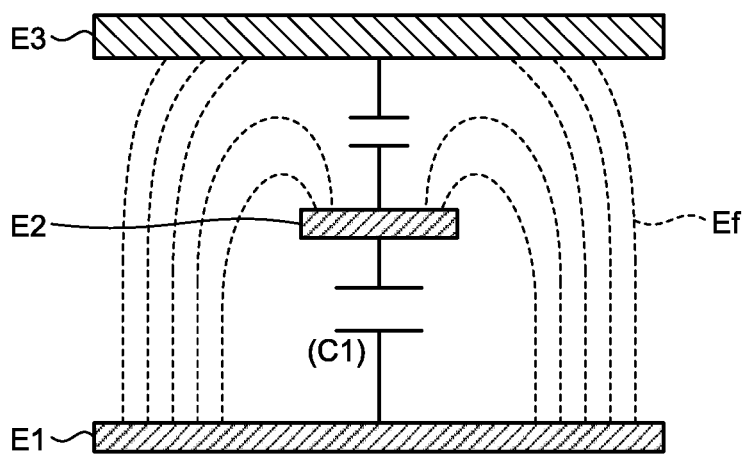
FIG. 6 is an explanatory diagram illustrating an example of a fringe electric field in the state in which the finger is in contact with or in proximity to the display apparatus as illustrated in FIG. 5.
Figure 7:
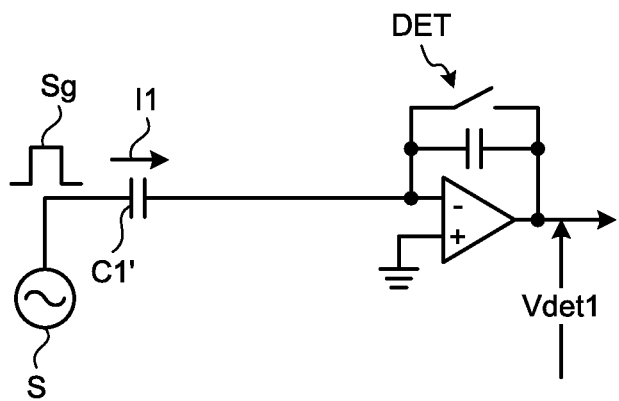
FIG. 7 is an explanatory diagram illustrating an example of an equivalent circuit in the state in which the finger is in contact with or in proximity to the display apparatus as illustrated in FIG. 5.
Figure 8:
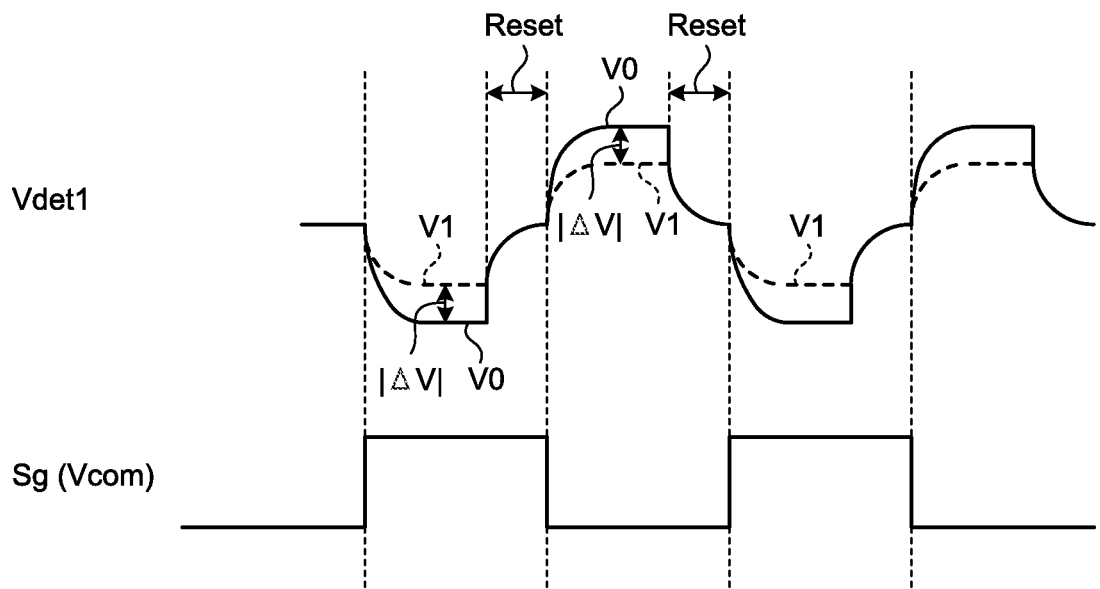
FIG. 8 is a diagram illustrating an example of the waveforms of a detection drive signal and a first detection signal according to a mutual capacitive method.

As described above, the touch panel 30 operates based on the basic principle of capacitive touch detection. The following describes the basic principle of mutual capacitive touch detection by the display apparatus 1 with a touch detection function according to the present embodiment, with reference to FIG. 2 to FIG. 8. FIG. 2 is an explanatory diagram illustrating a state in which a finger is neither in contact with nor in proximity to a display apparatus, for explaining the basic principle of mutual capacitive touch detection. FIG. 3 is an explanatory diagram illustrating an example of a fringe electric field in the state in which the finger is neither in contact with nor in proximity to the display apparatus as illustrated in FIG. 2. FIG. 4 is an explanatory diagram illustrating an example of an equivalent circuit in the state in which the finger is neither in contact with nor in proximity to the display apparatus as illustrated in FIG. 2. FIG. 5 is an explanatory diagram illustrating a state in which a finger is in contact with or in proximity to a display apparatus, for explaining the basic principle of mutual capacitive touch detection. FIG. 6 is an explanatory diagram illustrating an example of a fringe electric field in the state in which the finger is in contact with or in proximity to the display apparatus as illustrated in FIG. 5. FIG. 7 is an explanatory diagram illustrating an example of an equivalent circuit in the state in which the finger is in contact with or in proximity to the display apparatus as illustrated in FIG. 5. FIG. 8 is a diagram illustrating an example of the waveforms of a detection drive signal and a first detection signal. The following describes an example of a finger in contact with or in proximity to the display apparatus. However, the present disclosure is not limited to the finger, and may employ an object including a conductor, such as a stylus pen.

For example, as illustrated in FIG. 2, a capacitive element C1 includes a pair of electrodes, i.e., a drive electrode E1 and a detection electrode E2, arranged to face each other with a dielectric D interposed therebetween. The drive electrode E1 corresponds to the first sensor electrode COML described blow and the detection electrode E2 corresponds to a second sensor electrode TDL described below. In the capacitive element C1, electric lines of force Ef for a fringe extending from an end portion of the drive electrode E1 to an upper surface of the detection electrode E2 are generated as illustrated in FIG. 3, in addition to electric lines of force generated between counter surfaces of the drive electrode E1 and the detection electrode E2. As illustrated in FIG. 4, one end of the capacitive element C1 is coupled to an alternating-current signal source (drive signal source) S and the other end thereof is coupled to a voltage detector DET. The voltage detector DET is an integrator included in the detection signal amplifier 42 illustrated in FIG. 1, for example.

When an alternating-current square wave Sg of a predetermined frequency (e.g., about several kHz to several hundreds of kHz) is applied from the alternating-current signal source S to the drive electrode E1 (one end of the capacitive element C), an output waveform (the first detection signal Vdet1) as illustrated in FIG. 8 appears through the voltage detector DET coupled to the detection electrode E2 side (the other end of the capacitive element C1). The alternating-current square wave Sg corresponds to a detection drive signal Vcom input from the first sensor driver 14.

In the state in which a finger is neither in contact with nor in proximity to the display apparatus (non-contact state), a current I0 according to a capacitance value of the capacitive element C1 flows with charge or discharge to or from the capacitive element C1, as illustrated in FIG. 4. The voltage detector DET illustrated in FIG. 4 converts variation of the current I0 according to the alternating-current square wave Sg into variation of a voltage (a waveform V0 in the solid line illustrated in FIG. 8).

On the other hand, in the state in which a finger is in contact with or is in proximity to the display apparatus (contact state), a capacitance C2 generated by the finger is in contact with or is in proximity to the detection electrode E2, as illustrated in FIG. 5. Accordingly, a conductor E3 (the finger) blocks the electric lines of force Ef for a fringe between the drive electrode E1 and the detection electrode E2, as illustrated in FIG. 6. The capacitive element C1 thus acts as a capacitive element C1' with a smaller capacitance value than the capacitance value in the non-contact state, as illustrated in FIG. 7. In the equivalent circuit illustrated in FIG. 7, a current I1 flows through the capacitive element Cr. As illustrated in FIG. 8, the voltage detector DET converts variation of the current I1 according to the alternating-current square wave Sg into variation of a voltage (a waveform V1 indicated by the dotted line). In this case, the waveform V1 has a smaller amplitude than that of the waveform V0. As a result, an absolute value $|\Delta V|$ of the voltage difference between the waveform V0 and the waveform V1 varies depending on the influence of the conductor E3 such as the finger that comes into contact with or in proximity to the display apparatus from the outside. To accurately detect the absolute value $|\Delta V|$ of the voltage difference between the waveform V0 and the waveform V1, the voltage detector DET preferably performs the operation with a period Reset to reset charge and discharge of a capacitor in accordance with the frequency of the alternating-current square wave Sg by switching in the circuit.

The touch panel 30 illustrated in FIG. 1 performs mutual capacitive touch detection by sequentially scanning each supply unit of the first sensor electrode(s) COML in accordance with the first drive signal Vcom supplied from the first sensor driver 14. A supply unit of the first sensor electrode(s) COML may be one first sensor electrode COML or may be a set of first sensor electrodes COML to which the first drive signal Vcom is supplied at the same time.

The touch panel 30 outputs the first detection signal Vdet1 for each supply unit of the first sensor electrode(s) COML from a plurality of second sensor electrodes TDL described below through the voltage detector DET illustrated in FIG. 4 or 7. The first detection signal Vdet1 is supplied to the detection signal amplifier 42 of the detector 40.

The detection signal amplifier 42 amplifies the first detection signal Vdet1 supplied from the touch panel 30. The detection signal amplifier 42 may include an analog low pass filter (LPF) that removes a high frequency component (noise component) included in the first detection signal Vdet1 and then outputs the signal.

The A/D converter 43 samples an analog signal output from the detection signal amplifier 42 and converts the analog signal into a digital signal at timing in synchronization with the first drive signal Vcom.

The signal processor 44 includes a digital filter that reduces frequency components (noise components) other than a frequency at which the first drive signal Vcom is sampled, included in the output signal of the A/D converter 43. The signal processor 44 is a logic circuit that detects whether a touch is made on the touch panel 30, in accordance with the output signal of the A/D converter 43. The signal processor 44 performs processing of extracting only a difference of the detection signals caused by the finger. The signal of the difference caused by the finger is the absolute value $|\Delta V|$ of the difference between the waveform V0 and the waveform V1. The signal processor 44 may perform an arithmetic operation for averaging the absolute values $|\Delta V|$ per supply unit of the first sensor electrode(s) COML, thereby calculating the average value of the absolute values $|\Delta V|$. The signal processor 44 thus can reduce the influence of noise. The signal processor 44 compares the signal of the difference caused by the detected finger with a predetermined threshold voltage. When the difference is less than the threshold voltage, the signal processor 44 determines that the external proximity object is in the non-contact state. On the other hand, when the difference is equal to or larger than the threshold voltage, the signal processor 44 determines that the external proximity object is in the contact state. In this way, the detector 40 can perform the touch detection.

The coordinate extractor 45 is a logic circuit that obtains touch panel coordinates when the touch is detected by the signal processor 44. The coordinate extractor 45 outputs the touch panel coordinates as a detection signal output Vout. As described above, the display apparatus 1 with a touch detection function of the present embodiment can detect the touch panel coordinates of the position at which the conductor such as the finger is in contact therewith or is in proximity thereto, on the basis of the basic principle of the touch detection by the mutual capacitive method.

Figure 9:
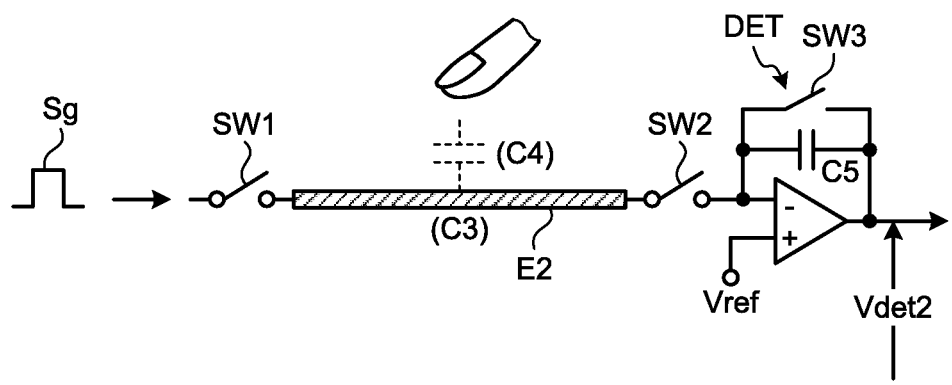
FIG. 9 is an explanatory diagram illustrating an example of an equivalent circuit for self-capacitive touch detection.
Figure 10:
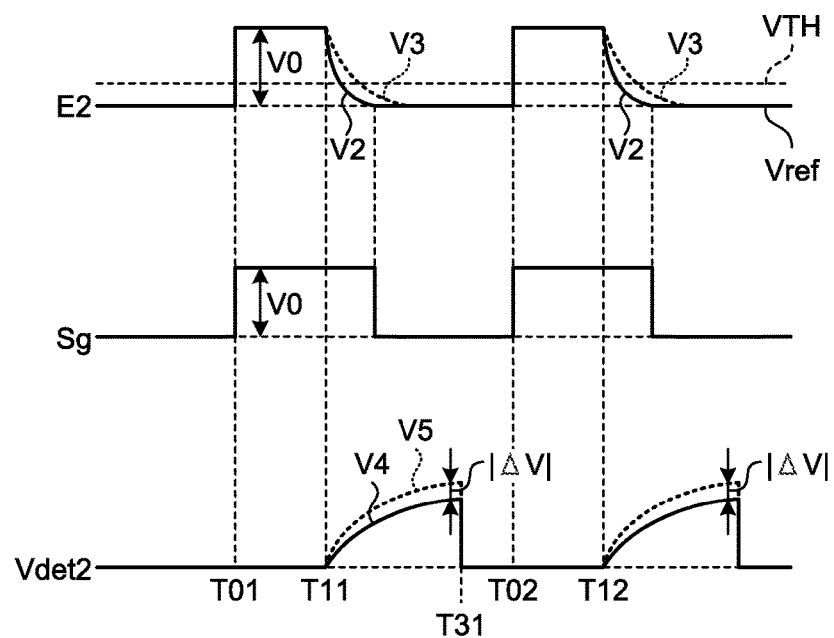
FIG. 10 is a diagram illustrating an example of the waveforms of a detection drive signal and a second detection signal according to a self-capacitive method.

Subsequently, the basic principle of self-capacitive touch detection will be described with reference to FIGS. 9 and 10. FIG. 9 is an explanatory diagram illustrating an example of an equivalent circuit for self-capacitive touch detection. FIG. 10 is a diagram illustrating an example of the waveforms of a detection drive signal and a second detection signal according to the self-capacitive method. FIG. 9 illustrates a detection circuit together with the equivalent circuit.

As illustrated in FIG. 9, the voltage detector DET is coupled to the detection electrode E2. In the state in which the finger is neither in contact with nor in proximity to the display apparatus, the alternating-current square wave Sg is applied to the detection electrode E2, and a current flows through the detection electrode E2, the current according to a capacitance C3 of the detection E2. The voltage detector DET converts variation of the current according to the alternating-current square wave Sg in the non-contact state into variation of a voltage (a waveform V4 indicated by the solid line in FIG. 10). In the state in which the conductor such as the finger is in contact with or is in proximity to the display apparatus (contact state), a capacitance C4 between the conductor and the detection electrode E2 is added to capacitance C3 of the detection electrode E2. When the alternating-current square wave Sg is applied to the detection electrode E2, a current according to the capacitance C3 and the capacitance C4 flows through the detection electrode E2. The voltage detector DET converts variation of the current according to the alternating-current square wave Sg in the contact state into variation of a voltage (a waveform V5 indicated by the dotted line). Whether there is the conductor in contact with or in proximity to the detection electrode E2 can be determined by integrating the voltage values of the obtained waveforms V4 and V5, and comparing the integrated values. Whether there is the conductor in contact with or in proximity to the detection electrode E2 may be determined on the basis of a period until a waveform V2 and a waveform V3 illustrated in FIG. 10 are lowered to a predetermined reference voltage VTH. This alternating-current square wave Sg corresponds to a detection drive signal Vd to be described below.

In FIG. 10, the alternating-current square wave Sg rises to a voltage level corresponding to a voltage V0 at time T01. At this time, a switch SW1 is ON and a switch SW2 is OFF. The voltage of the detection electrode E2 thus rises to the voltage V0. Subsequently, the switch SW1 is turned OFF before time T11. At this time, while the detection electrode E2 is in a floating state, a potential of the detection electrode E2 is maintained to the voltage V0 by the capacitance C3 of the detection electrode E2, or the capacitance C3+the capacitance C4 (see FIG. 9) obtained by adding the capacitance C4 caused by contact or proximity of the conductor to the capacitance C3 of the detection electrode E2. Further, a switch SW3 is turned ON before the time T11 and is turned OFF after the elapse of a predetermined time to reset the voltage detector DET. By this reset operation, the second detection signal Vdet2 has a voltage substantially the same as a reference voltage Vref.

Subsequently, when the switch SW2 is turned ON at the time T11, an inverting input unit of the voltage detector DET has the voltage V0 of the detection electrode E2, and then the potential of the inserting input unit of the voltage detector DET is decreased to the reference voltage Vref according to a time constant of the capacitance C3 of the detection electrode E2 (or C3+C4) and that of a capacitance C5 in the voltage detector DET. At this time, charges accumulated in the capacitance C3 of the detection electrode E2 (or C3+C4) are moved to the capacitance C5 in the voltage detector DET, which increases the second detection signal Vdet2 that is an output voltage of the voltage detector DET. When the finger or the like is not in proximity to the detection electrode E2, the second detection signal Vdet2 as an output voltage of the voltage detector DET has the waveform V4 indicated by the solid line, and Vdet2=C3× V0/C5 is satisfied. When a capacitance caused by the influence of the finger or the like is added, the second detection signal Vdet2 as an output voltage of the voltage detector DET has the waveform V5 indicated by the dotted line, and Vdet2=(C3+C4)×V0/C5 is satisfied. Subsequently, at time T31 after charges of the capacitance C3 of the detection electrode E2 (or C3+C4) have been sufficiently moved to the capacitance C5, the switch SW2 is turned OFF and the switch SW1 and the switch SW3 are turned ON to cause the potential of the detection electrode E2 to be at a low level that is the same level as the potential of the alternating-current square wave Sg and reset the voltage detector DET.

The above operation is repeated at a predetermined frequency (e.g., about several kHz to several hundreds of kHz). Whether there is the external proximity object (whether there is the conductor or whether there is a touch) can be detected on the basis of an absolute value |ΔV| of a difference between the waveform V4 and the waveform V5. For example, as illustrated in FIG. 1, the signal processor 44 compares the signal (absolute value |ΔV|) of the difference caused by the detected finger with a predetermined threshold voltage. When the signal is less than the threshold voltage, the signal processor 44 determines that the external proximity object is in the non-contact state. On the other hand, when the difference is equal to or larger than the threshold voltage, the signal processor 44 determines that the external proximity object is in the contact state. The coordinate extractor 45 calculates touch panel coordinates, and outputs the touch panel coordinates as the detection signal output Vout. In this way, the detector 40 can detect a touch on the basis of the basic principle of the self-capacitive touch detection.

The above has described the detection of the external proximity object when the finger comes in contact with or in proximity to the display apparatus, with reference to FIGS. 9 and 10. Force applied to an input surface can also be detected on the basis of the above-described self-capacitive detection principle by providing an electric conductor facing the detection electrode E2. In this case, a distance between the detection electrode E2 and the electric conductor is changed according to the force applied to the input surface of the display device 10 with a touch detection function, which changes a capacitance generated between the detection electrode E2 and the electric conductor. The touch panel 30 outputs the second detection signal Vdet2 according to the change of the capacitance to the detection signal amplifier 42.

The detection signal amplifier 42, the A/D converter 43, and the signal processor 44 perform the above signal processing to obtain the above-described absolute value |ΔV| of the difference. The distance between the detection electrode E2 and the conductor is obtained based on the absolute value |ΔV|. The force applied to the input surface is thus calculated. The storage 47 temporarily stores information about the force calculated by the signal processor 44. The storage 47 may be a random access memory (RAM), a read only memory (ROM), a register circuit, or the like. The coordinate extractor 45 receives a plurality of pieces of information about force from the storage 47, calculates force at the input position from a distribution of the force applied to the input surface and the touch panel coordinates obtained from the touch detection, and then outputs the information about the force as an output signal.

Figure 11:
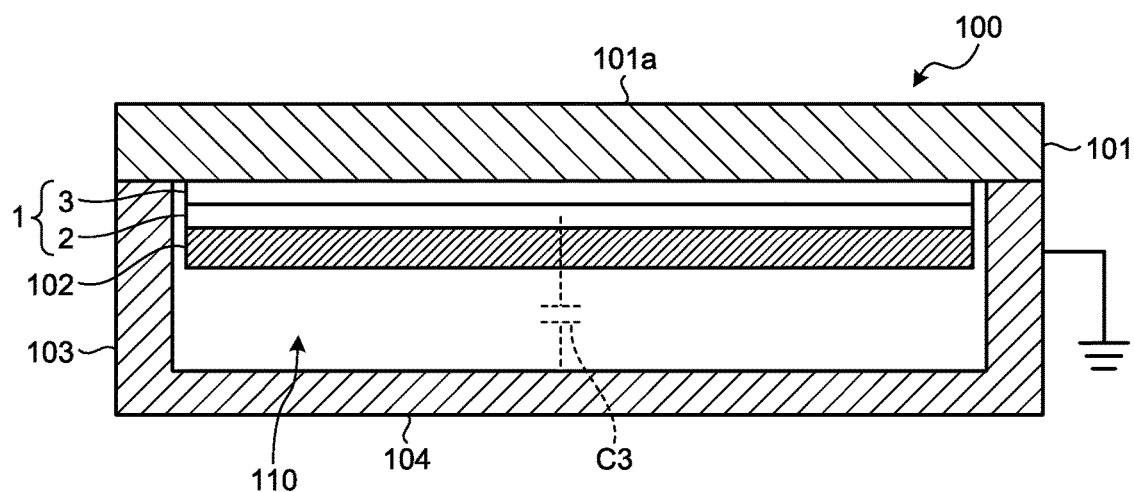
FIG. 11 is a sectional view illustrating a schematic sectional structure of an electronic apparatus including the display apparatus with a touch detection function.

FIG. 11 is a sectional view illustrating a schematic sectional structure of an electronic apparatus including the display apparatus with a touch detection function. An electronic apparatus 100 includes a cover member 101, the display apparatus 1 with a touch detection function, a backlight 102, and a housing 103. The cover member 101 is a protection member that protects the display apparatus 1 with a touch detection function, and may be a glass substrate having light-transmission properties, or a film base material using a resin, for example. One surface of the cover member 101 is an input surface 101a on which an input operation is performed by the finger or the like coming in contact therewith or in proximity thereto. The display apparatus 1 with a touch detection function includes an array substrate 2 and a counter substrate 3, which will be described below. The counter substrate 3 is provided on the array substrate 2, and the counter substrate 3 is arranged on the other surface of the cover member 101, that is, a surface opposite to the input surface 101a.

The backlight 102 is provided on the display apparatus 1 with a touch detection function on an opposite side to the cover member 101 side. The backlight 102 may be bonded to a lower surface side of the array substrate 2, or may be arranged with a predetermined interval from the array substrate 2. The backlight 102 includes a light source such as a light emitting diode (LED), and emits light from the light source toward the array substrate 2. The light from the backlight 102 passes through the array substrate 2, and switching between a portion where the light is blocked and a portion where the light is emitted according to the state of liquid crystals at the position causes an image to be displayed on the input surface 101a of the cover member 101. The backlight 102 can employ a known illumination unit, and various configurations. When the display panel 20 of the display apparatus 1 with a touch detection function is a reflective liquid crystal display apparatus, the backlight 102 may not be provided. The reflective liquid crystal display apparatus has a reflective electrode provided on the array substrate 2. The light entering from the cover member 101 side is reflected by the reflective electrode, passes through the cover member 101, and reaches the eyes of an observer.

The housing 103 is a box-like member having an opening at an upper portion, and is provided with the cover member 101 so as to cover the opening of the housing 103. The display apparatus 1 with a touch detection function, the backlight 102, and the like are housed in an internal space formed by the housing 103 and the cover member 101. As illustrated in FIG. 11, the display apparatus 1 with a touch detection function and the backlight 102 are arranged on the cover member 101 side, and a gap 110 is provided between the backlight 102 and a bottom portion of the housing 103.

The housing 103 is made of a conductive material such as metal, and is electrically coupled to the ground. The bottom portion of the housing 103 functions as an electric conductor 104 facing the first sensor electrode COML or the gate lines GCL when force is detected.

Applying the force to the input surface 101a deforms the array substrate 2 and the counter substrate 3 such that they become slightly warped towards the bottom portion side of the housing 103 together with the cover member 101. The display apparatus 1 with a touch detection function detects change of the capacitance C3 on the basis of the above-described self-capacitive detection principle, which allows a warping amount of the cover member 101, the display apparatus 1 with a touch detection function, and the backlight 102 to be obtained. This allows the force applied to the input surface 101a to be obtained.

An elastic body such as sponge or elastic rubber that is deformable according to the input force may be provided in the gap 110 between the backlight 102 and the bottom portion of the housing 103. The material of the housing 103 is not limited to the conductive material such as metal, and may be an insulating material such as a resin. In this case, a metal layer may be provided to at least the bottom portion of the housing 103 and may be used as the electric conductor 104.

Figure 12:
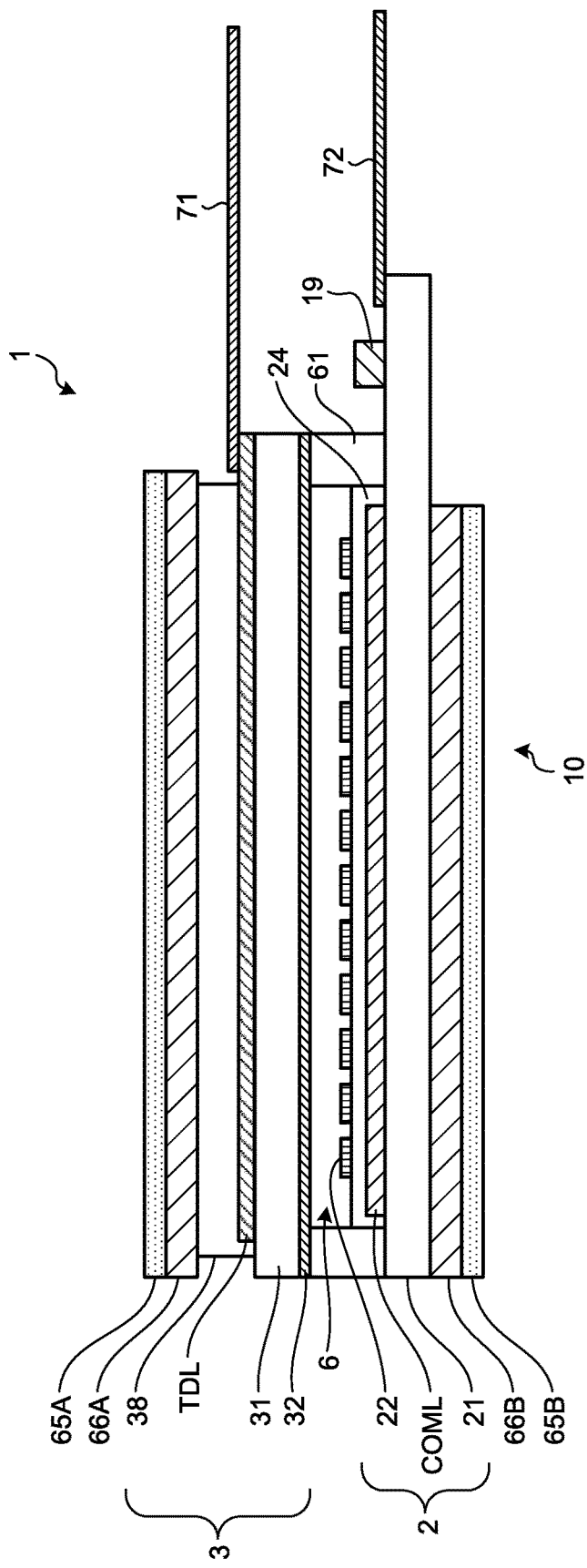
FIG. 12 is a sectional view illustrating a schematic sectional structure of the display apparatus with a touch detection function according to the first embodiment.
Figure 13:
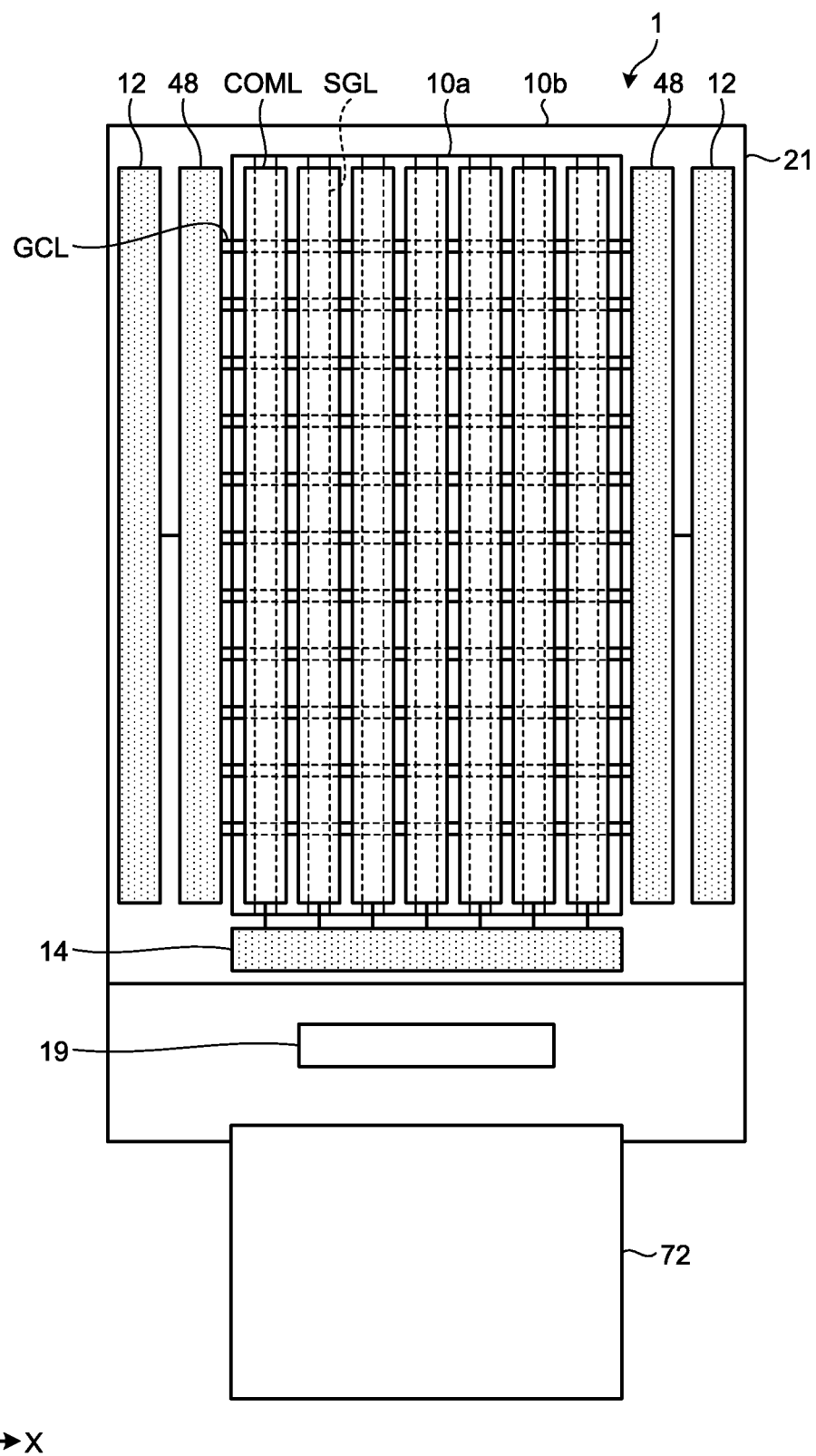
FIG. 13 is a plan view schematically illustrating a first substrate of the display apparatus with a touch detection function according to the first embodiment.
Figure 14:
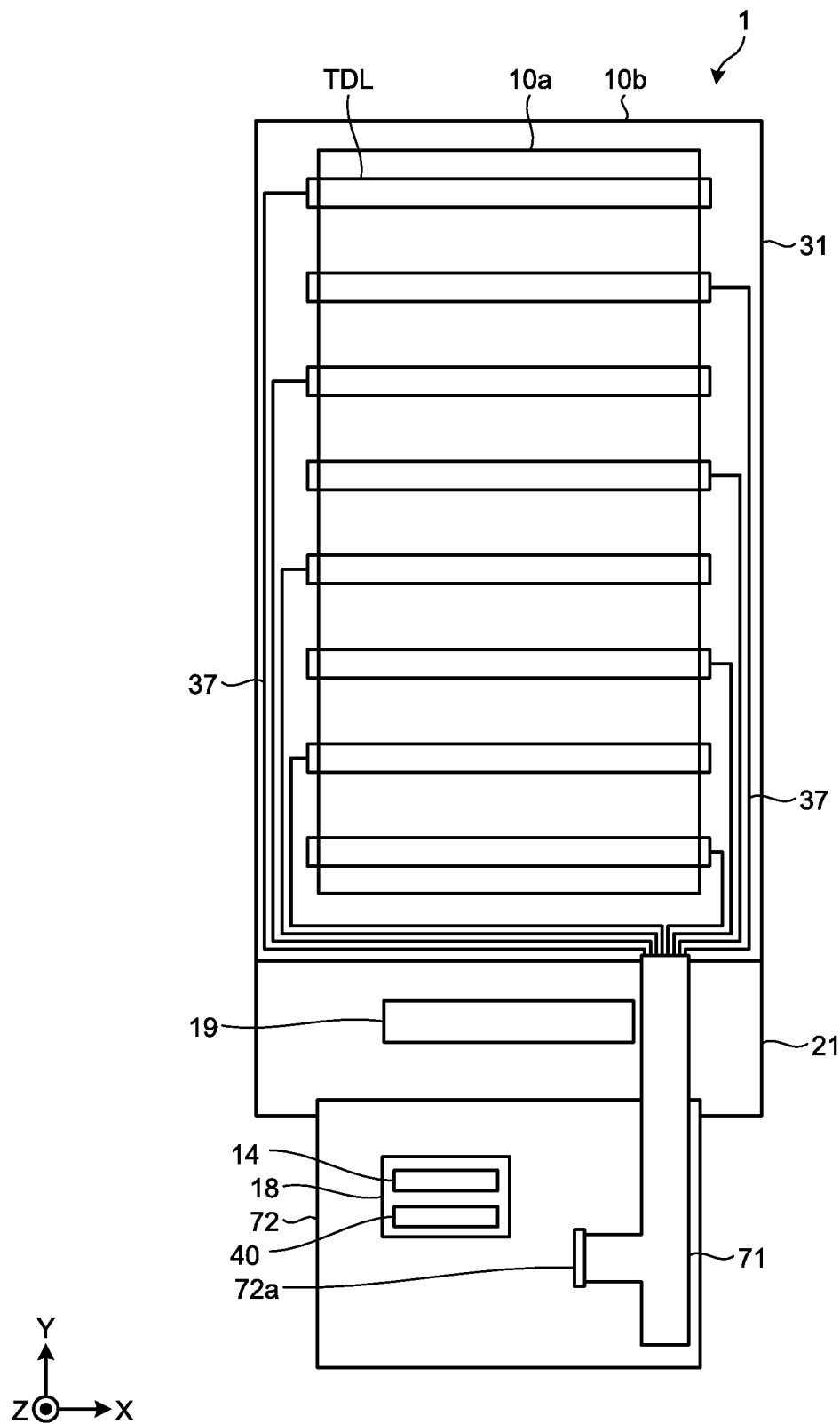
FIG. 14 is a plan view schematically illustrating a second substrate of the display apparatus with a touch detection function according to the first embodiment.

FIG. 12 is a sectional view illustrating a schematic sectional structure of the display apparatus with a touch detection function according to the first embodiment. FIG. 13 is a plan view schematically illustrating a first substrate of the display apparatus with a touch detection function according to the first embodiment. FIG. 14 is a plan view schematically illustrating a second substrate of the display apparatus with a touch detection function according to the first embodiment.

As illustrated in FIG. 12, the display device 10 with a touch detection function includes the array substrate 2, the counter substrate 3 arranged to face the array substrate 2 in a direction perpendicular to a surface of the array substrate 2, and a liquid crystal layer 6 serving as a display function layer interposed between the array substrate 2 and the counter substrate 3.

The array substrate 2 includes a first substrate 21 serving as a circuit substrate, pixel electrodes 22, the first sensor electrode COML, and an insulating layer 24. The pixel electrodes 22 are arranged in a matrix on a plane parallel to the first substrate 21. The first sensor electrodes COML are provided between the first substrate 21 and the pixel electrodes 22. The insulating layer 24 insulates the pixel electrodes 22 and the first sensor electrodes COML from each other. A polarizing plate 65B is provided on a surface of the first substrate 21 through an adhesive layer 66B, the surface being opposite to a surface thereof on which the first sensor electrodes COML are provided.

The first substrate 21 is provided with a first control integrated circuit (hereinafter referred to as the first control IC) 19. The first control IC 19 is a chip-on-glass (COG) mounted on the first substrate 21, and has the above-described controller 11 built therein. A flexible substrate 72 is coupled to an end portion of the first substrate 21. The first control IC 19 outputs a control signal to a gate line GCL and a source line SGL described below and the like, in accordance with the video signal Vdisp (see FIG. 1) supplied from an external host IC (not illustrated).

The counter substrate 3 includes a second substrate 31 and a color filter 32 formed on one surface of the second substrate 31. The second sensor electrode TDL that is a detection electrode of the touch panel 30 is provided on the other surface of the second substrate 31. A protection layer 38 is provided on the second sensor electrode TDL. Further, a polarizing plate 65A is provided above the second sensor electrode TDL through an adhesive layer 66A. A flexible substrate 71 is coupled to the second substrate 31. The flexible substrate 71 is coupled to the second sensor electrode TDL through a frame line described below. The color filter 32 may be arranged on the first substrate 21. In the present embodiment, the first substrate 21 and the second substrate 31 are, for example, glass substrates.

The first substrate 21 and the second substrate 31 are arranged to face each other with a predetermined interval interposed therebetween by a spacer 61. The liquid crystal layer 6 is provided in a space between the first substrate 21 and the second substrate 31. The liquid crystal layer 6 modulates light passing therethrough according to the state of an electric field, and employs liquid crystals of a transverse electric field mode, such as an in-plane switching (IPS) mode including a fringe field switching (FFS) mode. Orientation films are respectively arranged between the liquid crystal layer 6 and the array substrate 2, and between the liquid crystal layer 6 and the counter substrate 3 illustrated in FIG. 12. The orientation films are, for example, polyimide films.

As illustrated in FIG. 13, the display apparatus 1 with a touch detection function includes a display region 10a for displaying an image, and a frame region outside the display region 10a. The display region 10a has a rectangular shape. The frame region 10b has a frame shape surrounding four sides of the display region 10a. In the following description, a direction parallel to the short sides of the display region 10a (lateral direction in FIG. 13) is referred to as an X direction, a direction parallel to the long sides of the display region 10a (longitudinal direction in FIG. 13) is referred to as a Y direction, and a direction perpendicular to both the X direction and the Y direction is referred to as a Z direction.

The first sensor electrodes COML are provided in the display region 10a of the first substrate 21. The first sensor electrodes COML extend in the Y direction, and are arrayed in the X direction. The first sensor electrode COML is, for example, a patterned translucent conductive layer (also called a conductor film or a conductor pattern), and is made of, for example, a conductive material having translucent properties such as indium tin oxide (ITO), indium zinc oxide (IZO), and tin oxide (SnO).

The gate lines GCL in the display region 10a extend in the X direction. The gate lines GCL in the display region 101 are arrayed in the Y direction at a predetermined interval. That is, the gate lines GCL extend in a direction intersecting the extending direction of the first sensor electrodes COML, and are arrayed in the extending direction of the first sensor electrodes COML. The gate lines GCL are grade-separated from the respective first sensor electrodes COML.

The source lines SGL in the display region 10a extend in the Y direction. The source lines SGL in the display region 10a are arrayed in the X direction at a predetermined interval. The source lines SGL overlap with the first sensor electrodes COML in the Z direction, and extend in the extending direction of the first sensor electrodes COML.

As illustrated in FIG. 13 and FIG. 14, the gate drivers 12, the second sensor drivers 48, the first sensor driver 14, and the first control IC 19 are arranged in the frame region 10b. One of the gate drivers 12 and one of the second sensor drivers 48 are arranged along one side of the display region 10a, and the other of the gate drivers 12 and the other of the second sensor drivers 48 are arranged along a side opposite to the one side of the display region 10a. The second sensor drivers 48 are electrically coupled to the respective gate drivers 12, and are arranged closer to the display region 10a than the gate drivers 12. The flexible substrate 72 is coupled to the first substrate 21.

As illustrated in FIG. 14, the second sensor electrodes TDL are arranged on the second substrate 31. The second sensor electrodes TDL extend in the X direction and are arrayed in the Y direction. The second sensor electrodes TDL are, for example, formed of a translucent conductive material such as ITO, IZO, and SnO. The second sensor electrodes TDL are not limited to being formed of the above materials, and may be formed of, for example, metal thin wires or the like made of a metal material. Frame lines 37 are coupled to end portions of the respective second sensor electrodes TDL. The frame lines 37 extend along a long side of the frame region 10b and are coupled to the flexible substrate 71. A second control integrated circuit (hereinafter referred to as the second control IC) 18 is mounted on the flexible substrate 72. The detector 40 illustrated in FIG. 1 is mounted on the second control IC 18, and the first detection signal Vdet1 output from the second sensor electrode TDL is supplied to the second control IC 18 through the frame line 37 and the flexible substrate 71. The first sensor driver 14 illustrated in FIG. 1 is mounted on the second control IC 18 of the first embodiment. The flexible substrate 71 is coupled to the flexible substrate 72 through a connector 72a.

In the present embodiment, the second control IC 18 is a driver IC including the detector 40. The present disclosure is not limited to the present embodiment, and a part or all of the functions of the detector 40 may be provided as the functions of another micro-processing unit (MPU). To be specific, among various functions such as A/D conversion and noise removal that can be provided as the functions of the touch driver IC, some functions (e.g., noise removal) may be implemented in a circuit such as the MPU that is provided separately from the touch driver IC.

Figure 15:
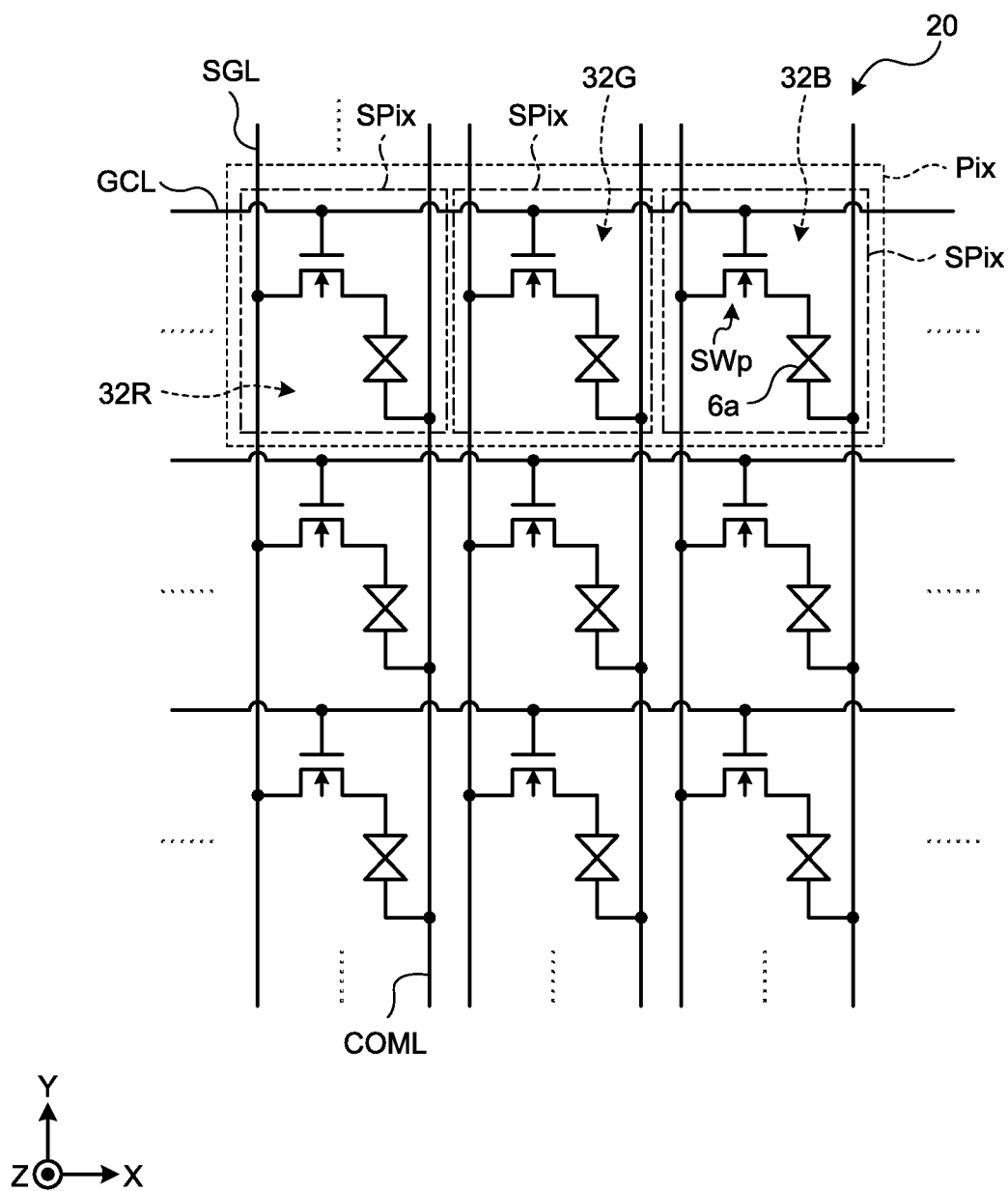
FIG. 15 is a circuit diagram illustrating a pixel array of a display device with a touch detection function according to the first embodiment.

Subsequently, a display operation of the display panel 20 will be described. FIG. 15 is a circuit diagram illustrating a pixel array of a display device with a touch detection function according to the first embodiment. The following elements are formed on the first substrate 21 (see FIG. 12): a switch SWp (first switch) serving as a switching element for a sub-pixel SPix illustrated in FIG. 15; the source line SGL that supplies a pixel signal Vpix to each pixel electrode 22; and the gate line GCL that supplies a drive signal (a signal having an on-voltage VGH or a signal having an off-voltage VGL to be described below) for driving each switch SWp.

The display panel 20 illustrated in FIG. 15 includes the sub-pixels SPix arrayed in a matrix. The sub-pixels SPix each include the switch SWp. For example, an n-channel metal oxide semiconductor (MOS)-type thin film transistor (TFT) constitutes the switch SWp. Each switch SWp is arranged in one sub-pixel SPix. The source of the switch SWp is coupled to the source line SGL, and the gate of the switch SWp is coupled to the gate line GCL. The drain of the switch SWp is coupled to the pixel electrode 22 (see FIG. 12) serving as one end of a display element 6a. The display element 6a is a capacitance generated between the pixel electrode 22 serving as the one end and the first sensor electrode COML serving as the other end. The liquid crystal layer 6 is driven by supply of the pixel signals Vpix to the respective pixel electrodes 22, and application of a common voltage to all of the first sensor electrodes COML. The display operation is thus performed.

The sub-pixel SPix is coupled to the other sub-pixels SPix belonging to the same row by the gate line GCL. The gate line GCL is coupled to the gate driver 12 (see FIG. 1), and is supplied with the scanning signal Vscan from the gate driver 12. The sub-pixel SPix is coupled to the other sub-pixels SPix belonging to the same column by the source line SGL. The source line SGL is coupled to the source driver 13 (see FIG. 1), and is supplied with the pixel signal Vpix from the source driver 13. Further, the sub-pixel SPix is coupled to the other sub-pixels SPix belonging to the same column by the first sensor electrode COML. The first sensor electrode COML is coupled to the first sensor driver 14 (see FIG. 1), and is supplied with the detection drive signal Vcom from the first sensor driver 14. That is, in this example, the sub-pixels SPix belonging to the same column shares one first sensor electrode COML. The direction in which the first sensor electrode COML extends is substantially the same as the direction in which the source line SGL extends.

The gate driver 12 illustrated in FIG. 1 performs drive by sequentially scanning the gate lines GCL. The gate driver 12 sequentially selects one row (one horizontal line) of the sub-pixels SPix as a target of display drive by applying the scanning signal Vscan (see FIG. 1) to the gates of the switches SWp of the sub-pixels SPix through the scanning signal line GCL. The source driver 13 supplies the pixel signal Vpix to the sub-pixels SPix constituting the selected one horizontal line through the source line SGL. Then, in these sub-pixels SPix, display is performed for one horizontal line in accordance with the supplied pixel signal Vpix. When this display operation is performed, the first sensor electrodes COML are supplied with the ground potential GND.

In the color filter 32 illustrated in FIG. 12, color regions 32R, 32G, and 32B respectively colored in red (R), green (G), and blue (B), for example, may be periodically arrayed. Any one of the color regions 32R, 32G, and 32B corresponds to each sub-pixel SPix illustrated in FIG. 15. A set of the sub-pixel SPix corresponding to the color region 32R, the sub-pixel SPix corresponding to the color region 32G, and the sub-pixel SPix corresponding to the color region 32B constitutes a pixel Pix. As illustrated in FIG. 12, the color filter 32 faces the liquid crystal layer 6 in the Z direction. The color filter 32 may have a combination of other colors as long as the colors are different from one another. The color filter 32 is not limited to having the combination of three colors, and may have a combination of four colors.

Figure 16:
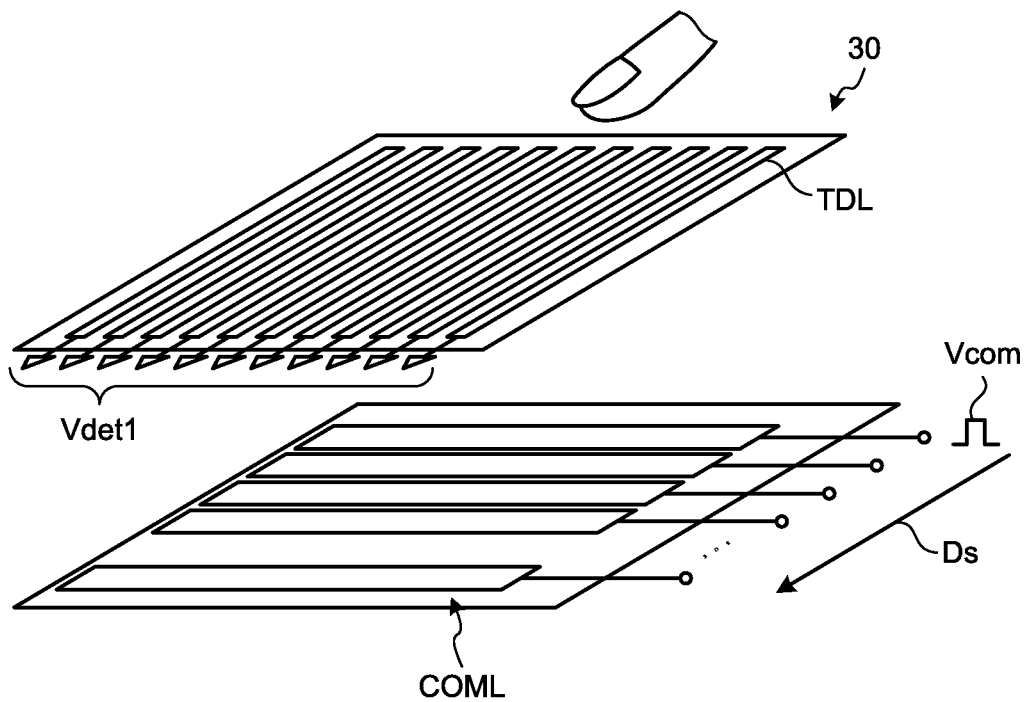
FIG. 16 is a perspective view illustrating an exemplary configuration of drive electrodes and detection electrodes of the display device with a touch detection function according to the first embodiment.

The first sensor electrodes COML illustrated in FIGS. 12 and 13 function as common electrodes that drive the liquid crystal layer 6 disposed between the first sensor electrodes COML and the pixel electrodes 22 of the display panel 20, and also function as drive electrodes when the touch panel 30 performs the mutual capacitive touch detection. The first sensor electrodes COML may function as detection electrodes when the touch panel 30 performs the mutual capacitive touch detection. FIG. 16 is a perspective view illustrating an exemplary configuration of drive electrodes and detection electrodes of the display device with a touch detection function according to the first embodiment. The first sensor electrodes COML provided on the array substrate 2 and the second sensor electrodes TDL provided on the counter substrate 3 constitute the touch panel 30.

The first sensor electrodes COML include a plurality of stripe electrode patterns extending in a lateral direction in FIG. 16. The second sensor electrodes TDL include a plurality of electrode patterns extending in the direction intersecting the extending direction of the electrode patterns of the first sensor electrodes COML. The second sensor electrodes TDL face the first sensor electrodes COML. The electrode patterns of the second sensor electrodes TDL are coupled to respective input terminals of the detection signal amplifier 42 of the detector 40 (see FIG. 1). A capacitance is generated in an intersection between each of the electrode patterns of the first sensor electrodes COML and each of the electrode patterns of the second sensor electrodes TDL.

With this configuration, when the touch panel 30 performs the mutual capacitive touch detection operation, the first sensor driver 14 performs drive by sequentially scanning each one supply unit of the first sensor electrode(s) COML in a time division manner, and thus sequentially selects one supply unit of the first sensor electrode(s) COML in a scanning direction Ds. This configuration causes the first detection signal Vdet1 to be output from the second sensor electrode TDL, and thus the touch detection is performed. That is, the one supply unit of the first sensor electrode(s) COML corresponds to the drive electrode E1 described in the basic principle of the mutual capacitive touch detection, and the second sensor electrode TDL corresponds to the detection electrode E2. The touch panel 30 thus detects the touch input according to the basic principle. As illustrated in FIG. 16, in the touch panel 30, the second sensor electrodes TDL and the first sensor electrodes COML grade-separated from each other constitute capacitive touch sensors in a matrix. This configuration enables detection of a position of contact or proximity of the external conductor.

Figure 17:
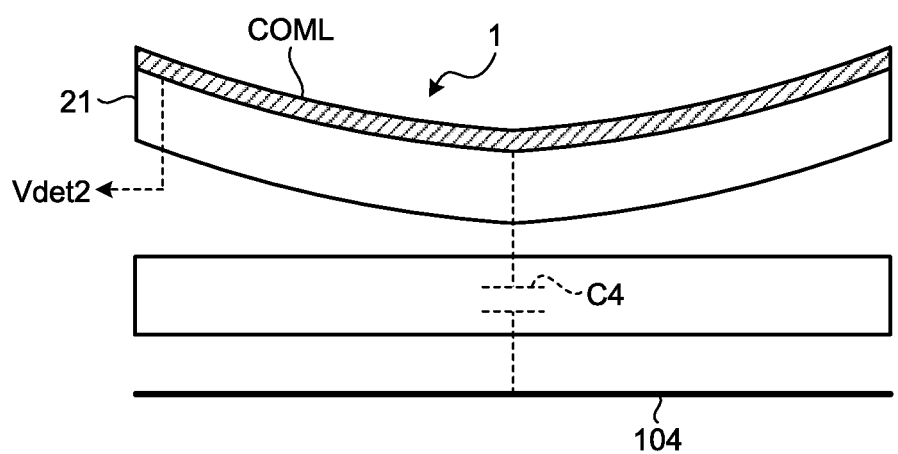
FIG. 17 is a diagram for explaining force detection performed by the display apparatus with a touch detection function according to the first embodiment.

FIG. 17 is a diagram for explaining force detection performed by the display apparatus with a touch detection function according to the first embodiment. As described above, the electric conductor 104 (e.g., the housing 103) is arranged so as to be separated from the first substrate 21 and face the first sensor electrodes COML. The capacitance C4 is generated between the first sensor electrode COML and the electric conductor 104. Applying force to the input surface 101a (see FIG. 11) of the cover member 101 deforms the cover member 101 such that it becomes slightly warped toward the electric conductor 104 side according to the force. The warping of the first substrate 21 together with the cover member 101 reduces the interval between the first sensor electrode COML and the electric conductor 104, and thus increases the capacitance C4.

The second detection signal Vdet2 is output from the first sensor electrode COML, as illustrated in FIG. 17, on the basis of the self-capacitive touch detection principle. That is, the first sensor electrode COML corresponds to the detection electrode E2 in the self-capacitive touch detection principle. In the present embodiment, the first sensor electrodes COML function as: the common electrodes for driving the liquid crystal layer 6 interposed between the first sensor electrodes COML and the pixel electrodes 22 of the display panel 20; the drive electrodes when the touch panel 30 performs the touch detection by the mutual capacitive method; and the detection electrodes when the touch panel 30 performs the force detection by the self-capacitive method. The magnitude of the force applied to the input surface 101a can be detected in accordance with the second detection signals Vdet2 output from the respective first sensor electrodes COML.

Figure 18:
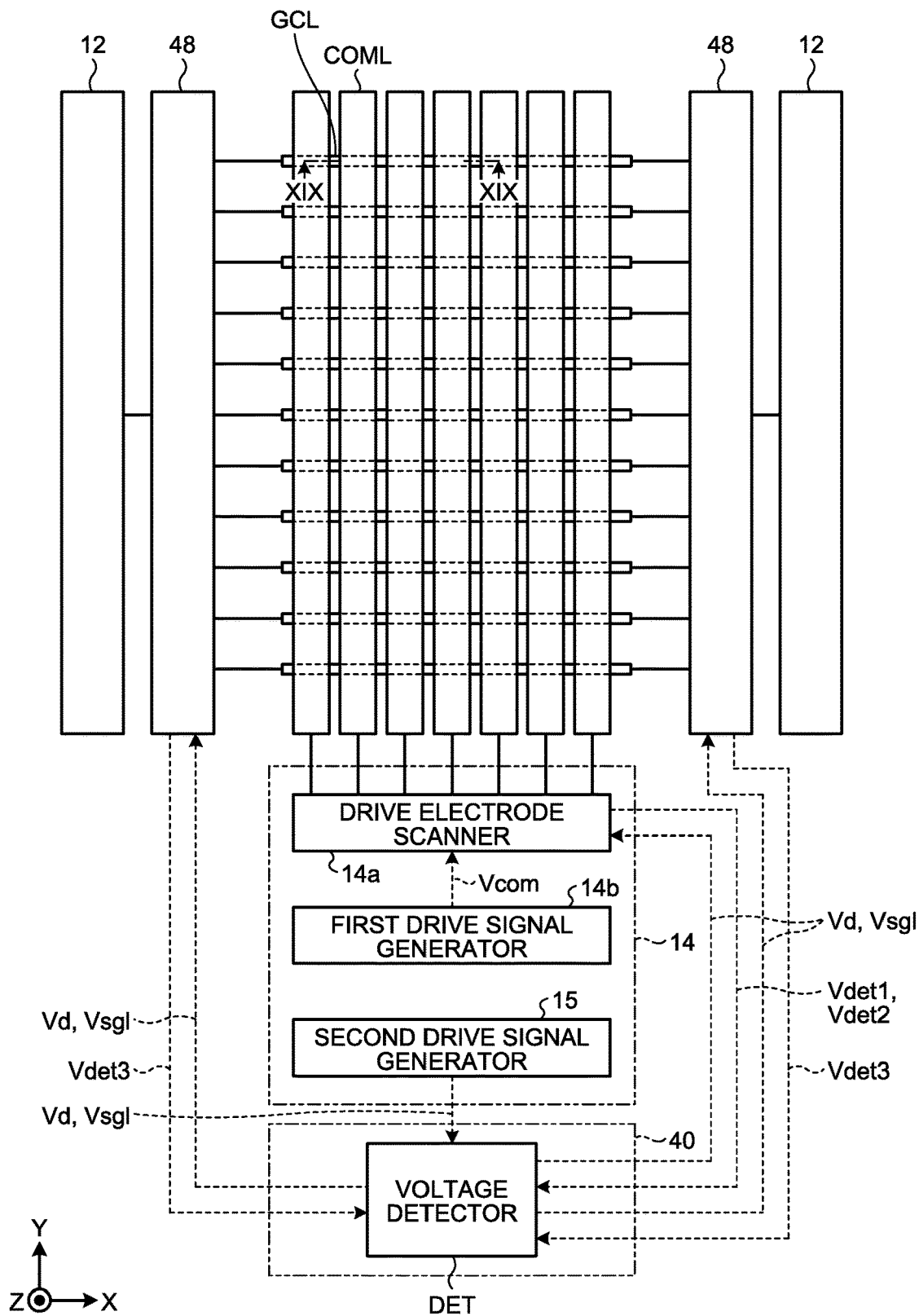
FIG. 18 is an enlarged plan view schematically illustrating the drive electrodes and wires according to the first embodiment.

FIG. 18 is an enlarged plan view schematically illustrating the drive electrodes and wires according to the first embodiment. Based on the above-described self-capacitive detection principle, the third detection signal Vdet3 is output from the gate line GCL selected by the second sensor drivers 48 as illustrated in FIG. 18. That is, each of the gate lines GCL corresponds to the detection electrode E2 in the self-capacitive detection principle. In the present embodiment, the gate lines GCL function as scanning lines of the display panel 20 and as detection electrodes for the self-capacitive force detection. The display apparatus 1 with a touch detection function is capable of, in accordance with the third detection signals Vdet3 output from the respective gate lines GCL, detecting the magnitude of force applied to the input surface 101a. The display apparatus 1 with a touch detection function is capable of, in accordance with the second detection signals Vdet2 and the third detection signals Vdet3, grasping the distribution of force applied to the input surface 101a. In this way, the present embodiment allows the position of the touch input to be detected, and also allows the magnitude of the force applied to the touch input position to be detected. In the present embodiment, the gate lines GCL and the first sensor electrodes COML are arranged in directions intersecting each other. The display apparatus 1 with a touch detection function is thus capable of, based on the detection result from the gate lines GCL and the detection result from the first sensor electrodes COML, calculating coordinates of a position of the applied force.

Figure 19:
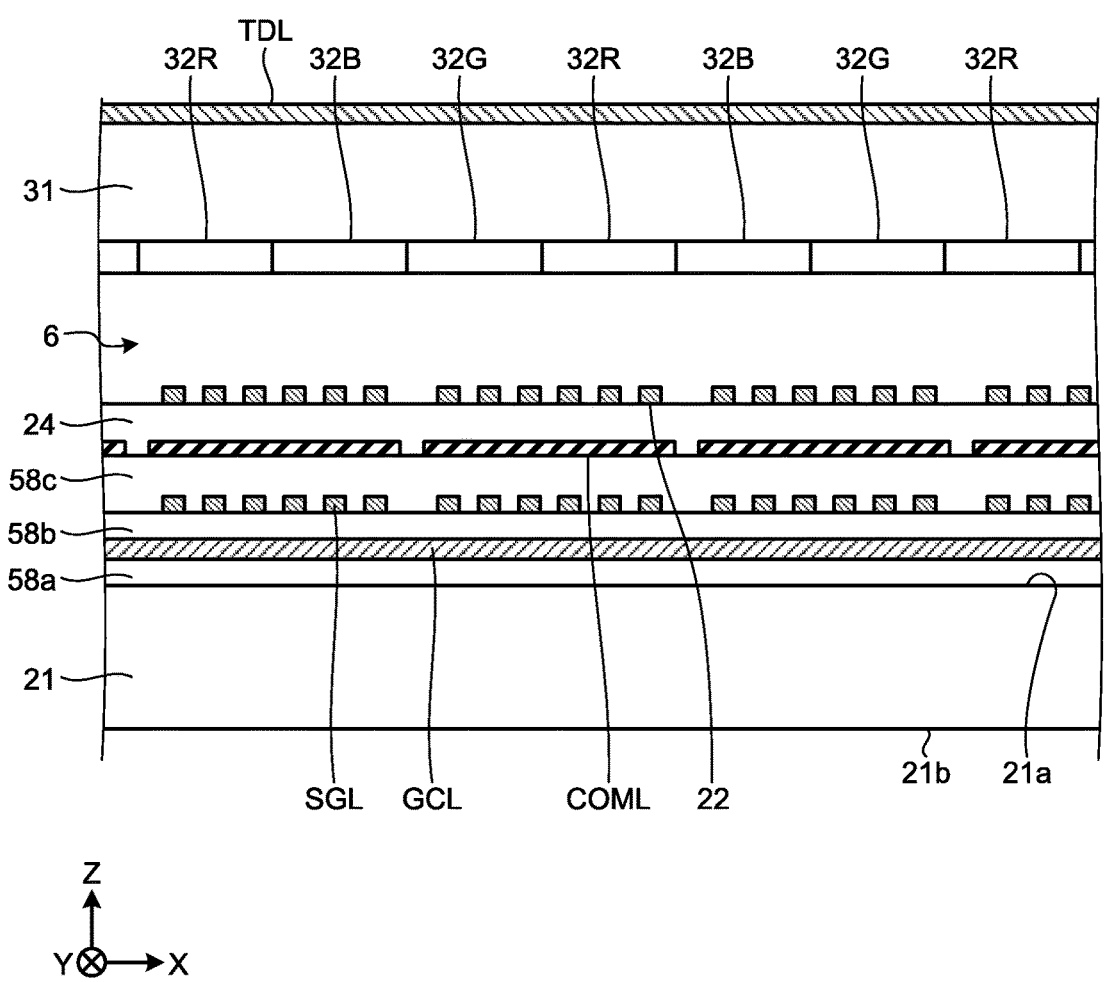
FIG. 19 is a sectional view illustrating a cross section taken along line XIX-XIX in FIG. 18.
Figure 20:
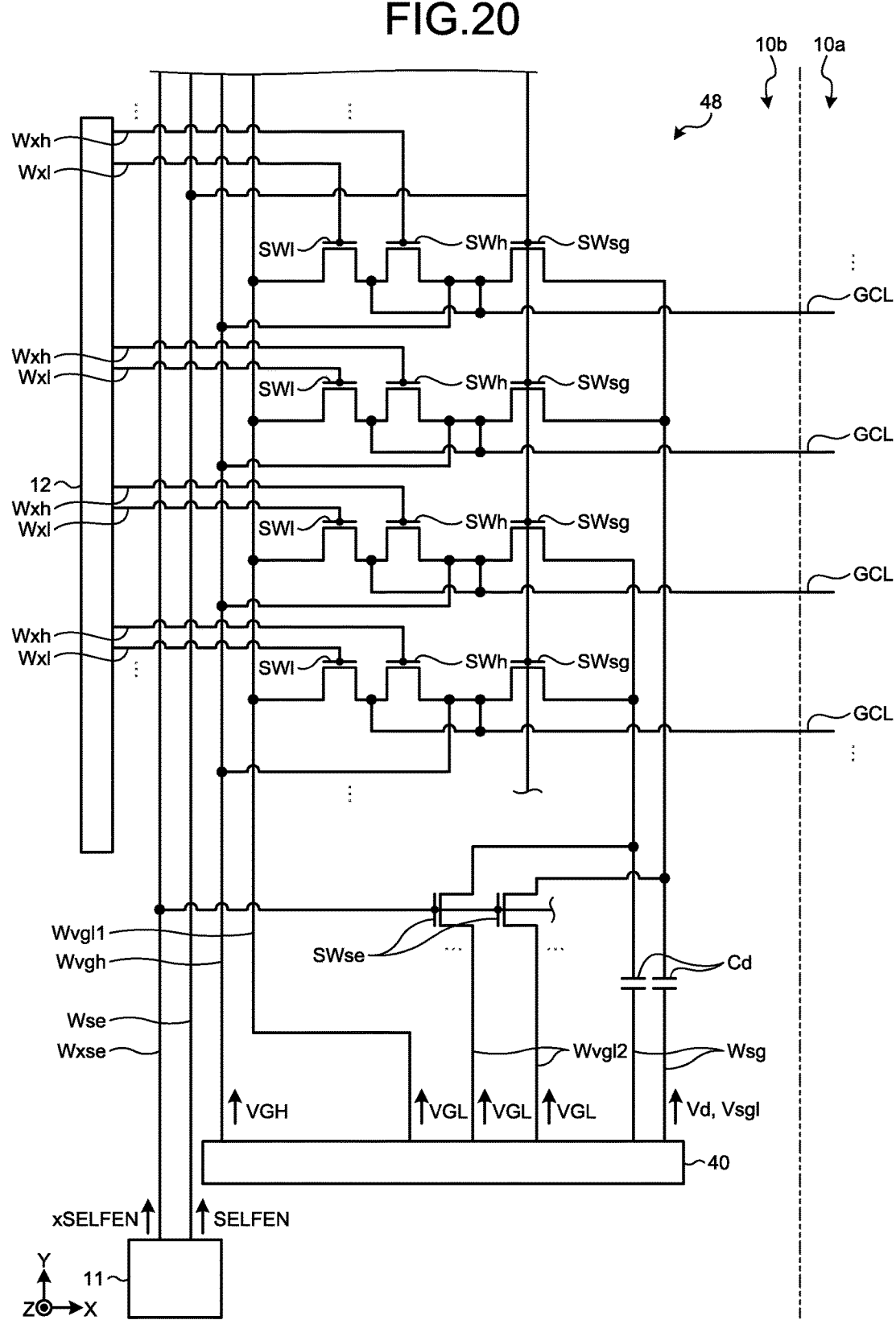
FIG. 20 is an enlarged plan view of the periphery of a second sensor driver according to the first embodiment.

Subsequently, a method for driving the first sensor electrodes COML and the gate lines GCL in a force detection operation will be described. FIG. 19 is a sectional view illustrating a cross section taken along line XIX-XIX in FIG. 18. FIG. 20 is an enlarged plan view of the periphery of a second sensor driver according to the first embodiment. FIG. 20 illustrates one of the second sensor drivers 48 arranged along two opposite sides of the display region 10a. The arrangement of each element of the other second sensor driver 48 not illustrated in FIG. 20 is line-symmetric to the corresponding element of the second sensor driver 48 illustrated in FIG. 20.

As illustrated in FIG. 19, the gate lines GCL are provided on a first surface 21a side on the first substrate 21 through an insulating layer 58a. An insulating layer 58b is provided on the gate lines GCL, and the source lines SGL are provided on the insulating layer 58b. An insulating layer 58c is provided on the source lines SGL, and the first sensor electrodes COML are provided on the insulating layer 58c. The insulating layer 24 is provided on the first sensor electrodes COML, and the pixel electrodes 22 are provided on the insulating layer 24. In this way, the gate lines GCL are provided so as to be separated from the first sensor electrodes COML and be closer to the first substrate 21 than the first sensor electrodes COML. The gate lines GCL are time-divisionally coupled to the second sensor drivers 48 illustrated in FIG. 13. Thus, the first sensor electrodes COML functioning as common electrodes for the gate lines GCL and the display elements 6a (see FIG. 15) are used as electrodes for the self-capacitive detection, which requires no additional wiring as third sensor electrodes for detecting force.

As illustrated in FIG. 18, the first sensor driver 14 includes a drive electrode scanner 14a, a first drive signal generator 14b, and a second drive signal generator 15. The first drive signal generator 14b generates and supplies the first drive signal Vcom to the drive electrode scanner 14a. In the mutual capacitive touch detection operation described above, the drive electrode scanner 14a sequentially selects one supply unit of the first sensor electrode(s) COML, and supplies the first drive signal Vcom to the selected one supply unit of the first sensor electrode(s) COML.

The second drive signal generator 15 is coupled to the drive electrode scanner 14a through the voltage detector DET. When the above-described self-capacitive force detection is performed, the second drive signal generator 15 supplies a detection drive signal Vd to the voltage detector DET. The drive electrode scanner 14a sequentially or simultaneously selects the first sensor electrodes COML. The potential of the selected first sensor electrodes COML is changed to become the same potential as that of the detection drive signal Vd supplied to the voltage detector DET.

The conductor 104 (see FIGS. 11 and 17) is provided on a second surface 21b side of the first substrate 21 so as to be separated from the first substrate 21, which is not illustrated in FIG. 19. The second detection signals Vdet2 according to change of the capacitance between the first sensor electrodes COML and the conductor 104 are output from the respective first sensor electrodes COML to the detector 40. The second drive signal generator 15 may be included in the second sensor driver 48, or may be mounted on the second control IC 18 (see FIG. 14). The detection drive signal Vd is supplied to the drive electrode scanner 14a through the voltage detector DET. However, the detection drive signal Vd may be supplied to the drive electrode scanner 14a without passing through the voltage detector DET.

As illustrated in FIG. 18, each of the second sensor drivers 48 is coupled to the corresponding gate driver 12 and the gate lines GCL, and switches signals to be supplied to the gate lines GCL. As illustrated in FIG. 20, the second sensor drivers 48 each include a plurality of switches SW1, a plurality of switches SWh, a plurality of switches SWsg (second switches), a plurality of switches SWse (third switches), a plurality of wires Wxh, a plurality of wires Wxl, a wire Wxse, a wire Wse, a wire Wvgh, a wire Wvgl1, a plurality of wires Wvgl2 (second wires), a plurality of wires Wsg (first wires), and a plurality of capacitive elements Cd. The switches SW1, the switches SWh, the switches SWsg, and the switches SWse are thin-film transistors (TFTs).

The switches SW1, the switches SWh, and the switches SWsg are arranged inside of the gate driver 12 (closer to the display region 10a than the gate driver 12) in a part of the frame region 10b. For example, the number of switches SW1, the number of switches SWh, and the number of switches SWsg are each equal to the number of gate lines GCL. Groups each consisting of the switch SW1, the switch SWh, and the switch SWsg that are arrayed in the X direction are arrayed in the Y direction. The switch SW1, the switch SWh, and the switch SWsg that are arrayed in the X direction are coupled to one another. Specifically, the drain of the switch SW1 is coupled to the source of the switch SWh, and the drain of the switch SWh is coupled to the source of the switch SWsg. The switch SW1, the switch SWh, and the switch SWsg are each coupled to the corresponding gate line GCL. Specifically, the drain of the switch SW1 is coupled to the gate line GCL, the source of the switch SWh is coupled to the gate line GCL, and the source of the switch SWsg is coupled to the gate line GCL. The switches SWse are arranged closer to the detector 40 than any of the switches SW1, the switches SWh, and the switches SWsg. The number of switches SWse is equal to the number of wires Wsg.

One of the wires Wxh is coupled to the gate driver 12 and to the gate of one of the switches SWh. One of the wires Wx1 is coupled to the gate driver 12 and to the gate of one of the switches SW1. The wire Wxse is coupled to the controller 11 and to the gates of the respective switches SWse.

The wire Wxse, the wire Wse, the wire Wvgh, and the wire Wvgl1 are arranged outside of the switches SW1, the switches SWh, and the switches SWsg (farther from the display region 10a than the switches SW1, the switches SWh, and the switches SWsg). The wire Wxse, the wire Wse, the wire Wvgh, and the wire Wvgl1 extend in the Y direction and are arranged in parallel to one another. The wire Wxse is coupled to the controller 11 and to the gates of the respective switches SWse. The wire Wse is coupled to the controller 11 and to the gates of the respective switches SWsg. The wire Wvgh is coupled to the detector 40 and to the drains of the respective switches SWh. An on-voltage VGH for turning ON the switches SWp is supplied from the detector 40 to the wire Wvgh. The wire Wvgl1 is coupled to the detector 40 and to the sources of the respective switches SW1. An off-voltage VGL for turning OFF the switches SWp is supplied from the detector 40 to the wire Wvgl1.

The wires Wvgl2 are coupled to the detector 40 and to the sources of the respective switches SWse. The off-voltage VGL is supplied from the detector 40 to each of the wires Wvgl2. The wires Wsg are arranged between the switches SWsg and the display region 10a. For example, one of the wires Wsg is coupled to the detector 40, to the drains of two of the switches SWsg, and to the drain of one of the switches SWse. That is, one of the wires Wsg is coupled to two of the gate lines GCL through the switches SWsg. The wires Wsg are grade-separated from the gate lines GCL in the frame region 10b.

The capacitive elements Cd are alternating-current (AC) coupling elements provided for preventing the switches SWp from malfunctioning to result in improper display. The capacitive elements Cd are provided to the respective wires Wsg. That is, each of the switches SWsg and the detector 40 are coupled to each other through the corresponding capacitive element Cd. When the detection drive signals Vd for force detection are supplied to the gate lines GCL, the detection drive signals Vd may cause the switches SWp to operate in some cases. The capacitive elements Cd offset the detection drive signals Vd, thereby preventing the switches SWp from malfunctioning.

The second drive signal generator 15 illustrated in FIG. 18 is coupled to the gate lines GCL through the voltage detector DET, the wires Wsg, and the switches SWsg. In the above-described self-capacitive force detection, the second drive signal generator 15 supplies the detection drive signals Vd to the voltage detector DET (see FIG. 18). The detection drive signals Vd are supplied to the gate lines GCL through the wires Wsg. The third detection signals Vdet3 are then output to the voltage detector DET through the wires Wsg. That is, the wires Wsg serve both as input wires that supply the detection drive signals Vd to the gate lines GCL and as output wires that extract the third detection signals Vdet3 from the gate lines GCL.

If the wires Wsg are arranged outside of the switches SWsg (farther from the display region 10a than the switches SWsg), the wires Wsg extending in the Y direction need to be grade-separated from other wires extending in the X direction. These other wires include, for example, drawn-out wires extending in the X direction that couple the main part of the wire Wvgl1 extending in the Y direction to the sources of the respective switches SW1. The off-voltage VGL supplied to the main part of the wire Wvgl1 is transmitted to the switches SW1 through the drawn-out wires. In a detection operation, the detection drive signals Vd are supplied to the wires Wsg, while signals having voltages different from the voltage of the detection drive signals Vd are supplied to other wires that intersect the wires Wsg. As a result, a parasitic capacitance is generated. The detection drive signal Vd is a pulse signal equivalent to the alternating-current square wave Sg illustrated in FIG. 10, and the speed of supplying the pulse to the gate lines GCL thus slows down with increase in parasitic capacitance generated in the wires, which reduces the speed of force detection.

On the other hand, the present embodiment has the wires Wsg arranged between the switches SWsg and the display region 10a, and thus the wires Wsg are grade-separated from the gate lines GCL. In a detection operation, the detection drive signals Vd are supplied to the wires Wsg and the gate lines GCL. Thus, the wire Wsg and the gate line GCL that are grade-separated from each other are at the same potential, which prevents generation of a parasite capacitance. That is, the configuration prevents slowdown of force detection using the gate lines GCL.

Figure 21:
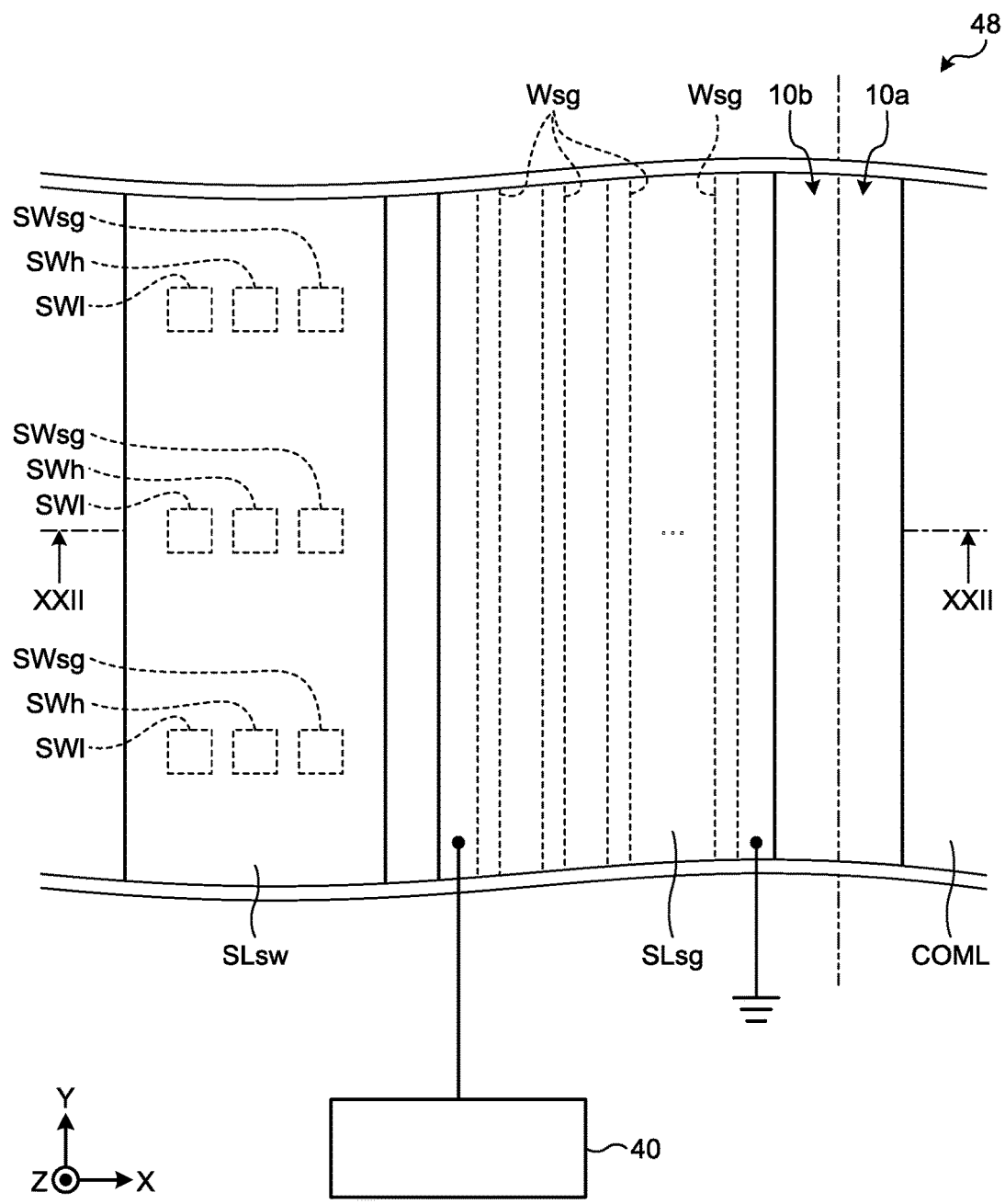
FIG. 21 is a plan view illustrating shields according to the first embodiment.
Figure 22:
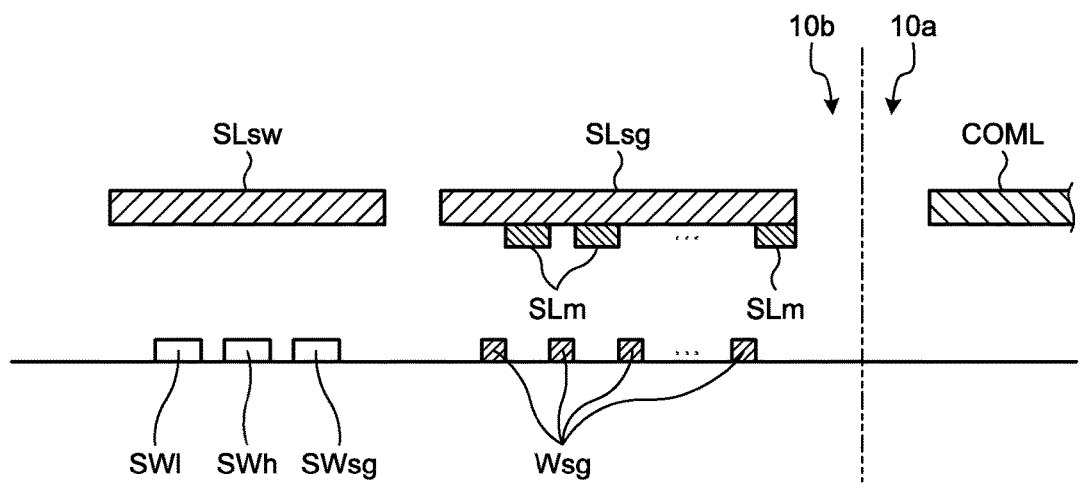
FIG. 22 is a sectional view illustrating a cross section taken along line XXII-XXII in FIG. 21.

FIG. 21 is a plan view illustrating shields according to the first embodiment. FIG. 22 is a sectional view illustrating a cross section taken along line XXII-XXII in FIG. 21. As illustrated in FIG. 21 and FIG. 22, the display apparatus 1 with a touch detection function includes a shield SLsw, a shield SLsg, and a plurality of metal members SLm. In FIG. 22, a structure between the shield SLsw and a group of the switch SW1, the switch SWh, and the switch SWsg, and a structure between the shield SLsg and the wires Wsg are omitted.

The shield SLsw and the shield SLsg are formed of, for example, a translucent conductive material such as indium tin oxide (ITO), indium zinc oxide (IZO), and tin oxide (SnO). As illustrated in FIG. 21, the shield SLsw has a belt-like shape extending in the Y direction, and overlaps the switches SW1, the switches SWh, and the switches SWsg when viewed in the Z direction.

The shield SLsg has a belt-like shape extending in the Y direction, and overlaps the wires Wsg when viewed in the Z direction. For example, in the present embodiment, the shield SLsg overlaps all of the wires Wsg when viewed in the Z direction. The shield SLsg is arranged at a distance from the shield SLsw. As illustrated in FIG. 21, the shield SLsg is coupled to the detector 40 and to the ground. For example, the shield SLsg is coupled to the ground through the housing 103 (see FIG. 11). In a force detection period Pf1 and a force detection period Pf2, which are described below, a guard signal Vsg1 is supplied from the detector 40 to the shield SLsg. That is, the shield SLsg is an active shield. For example, the shield SLsw and the shield SLsg are arranged in the same layer as that of the first sensor electrodes COML in the display region 10a, as illustrated in FIG. 22.

The metal members SLm are provided both on a surface of the shield SLsg, the surface facing the wires Wsg. For example, the metal members SLm are linear members extending in the Y direction. That is, the longitudinal direction of the metal members SLm is along the longitudinal direction of the wires Wsg. The metal members SLm are arranged in parallel to one another, and are arrayed in the X direction. That is, the metal members SLm are arrayed in a direction in which the wires Wsg are arrayed.

Figure 23:
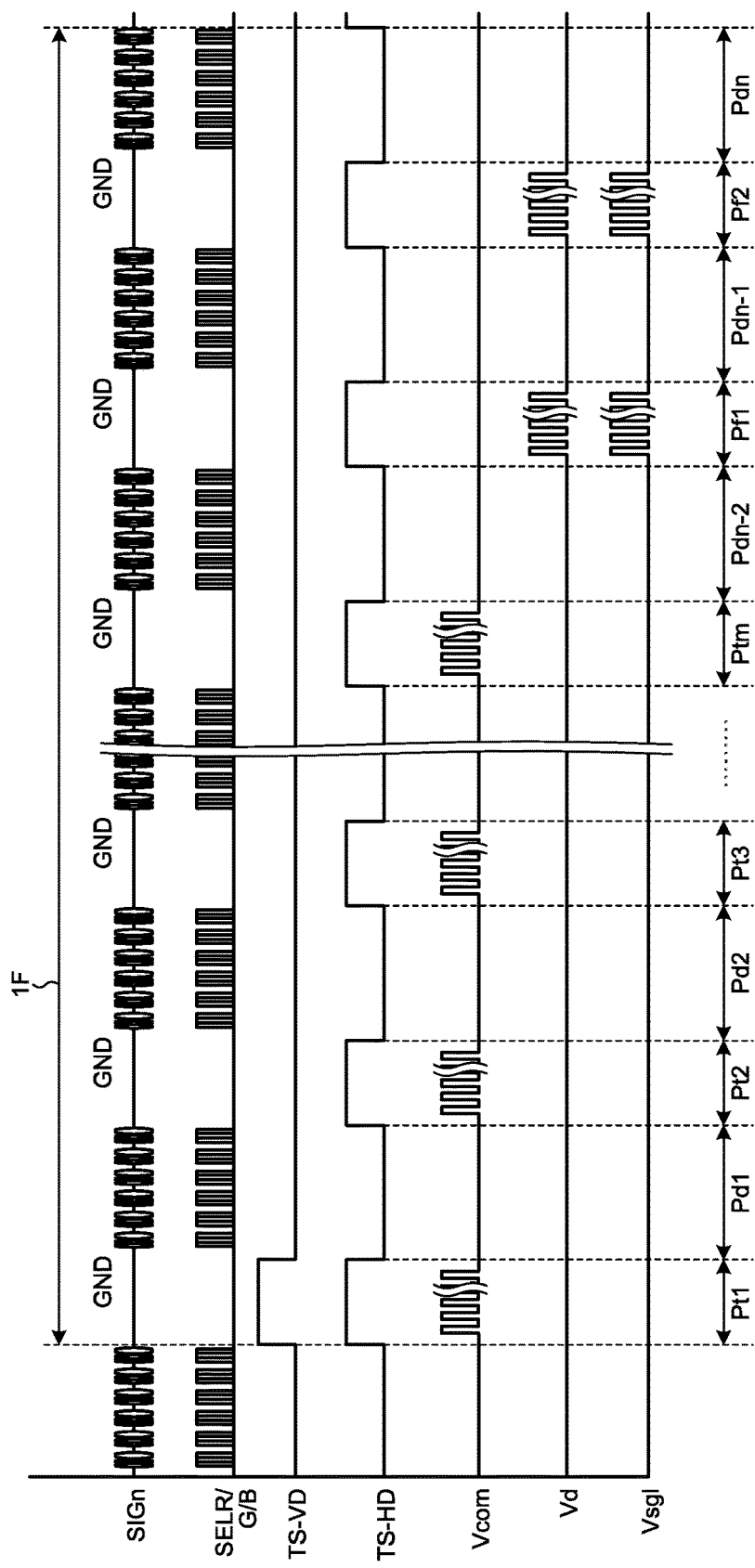
FIG. 23 is a timing waveform chart illustrating an exemplary operation of the display apparatus with a touch detection function according to the first embodiment.
Figure 24:
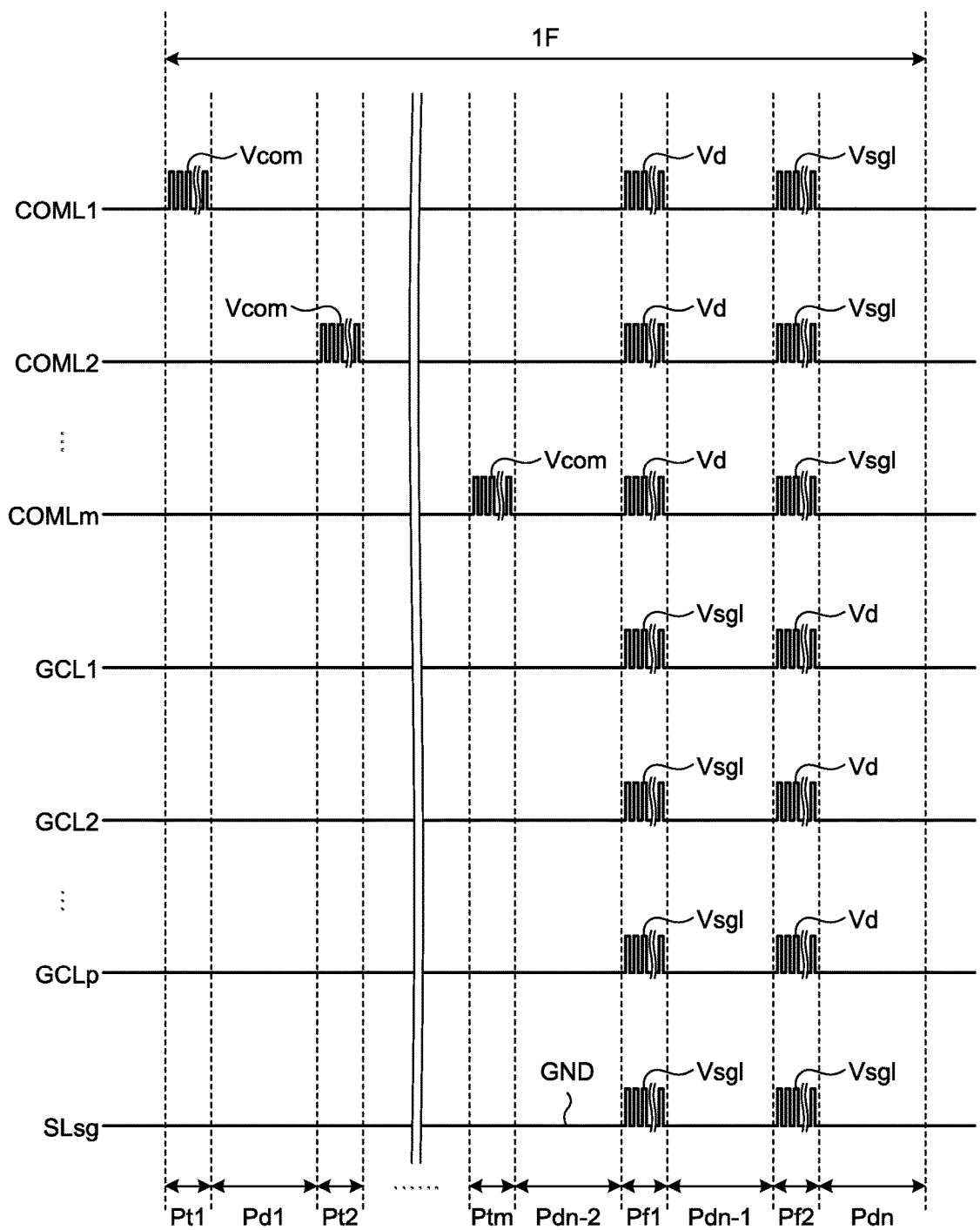
FIG. 24 is another timing waveform chart illustrating an exemplary operation of the display apparatus with a touch detection function according to the first embodiment.
Figure 25:
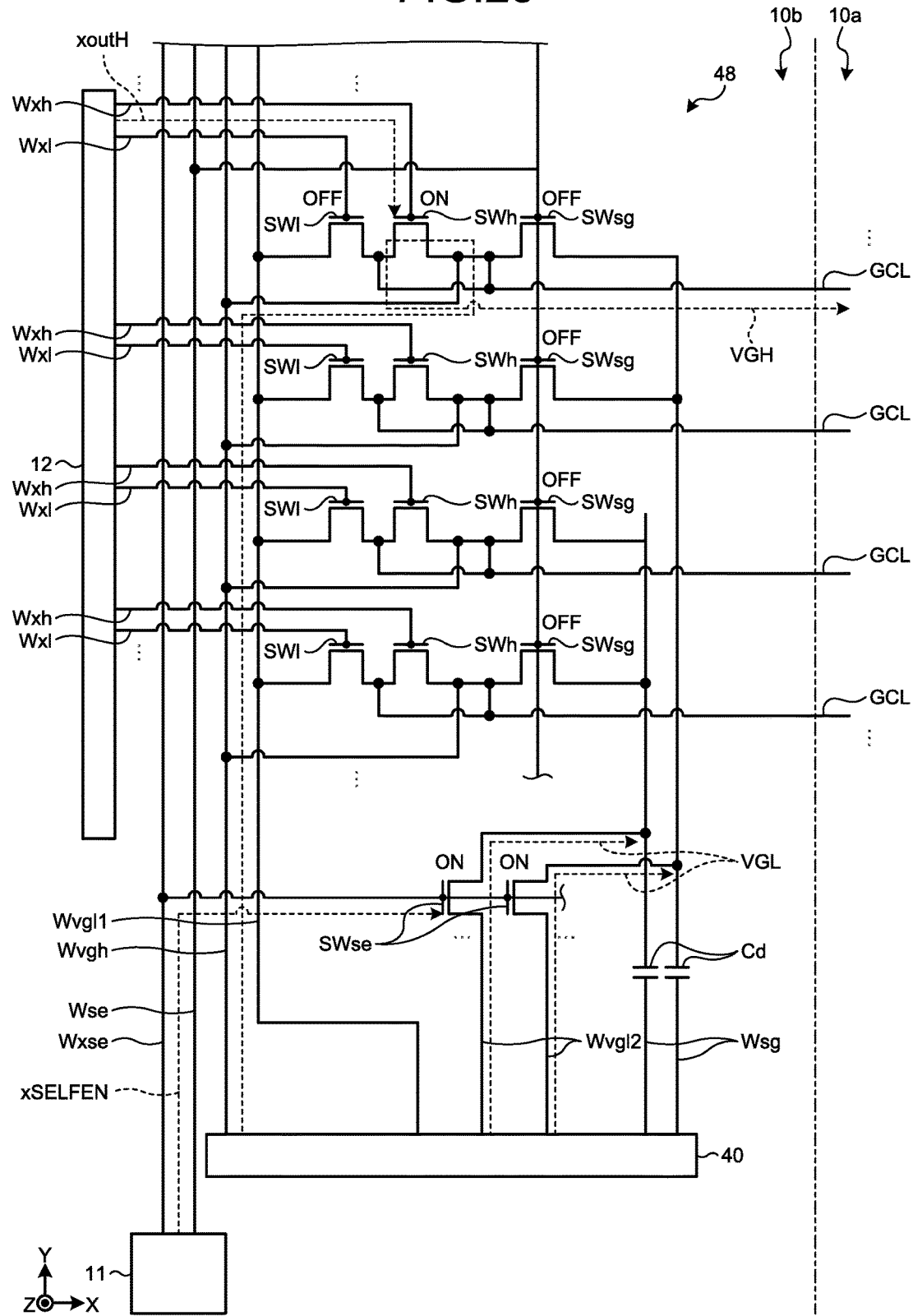
FIG. 25 is a schematic diagram illustrating an exemplary operation performed by the display apparatus with a touch detection function according to the first embodiment in a display period.
Figure 26:
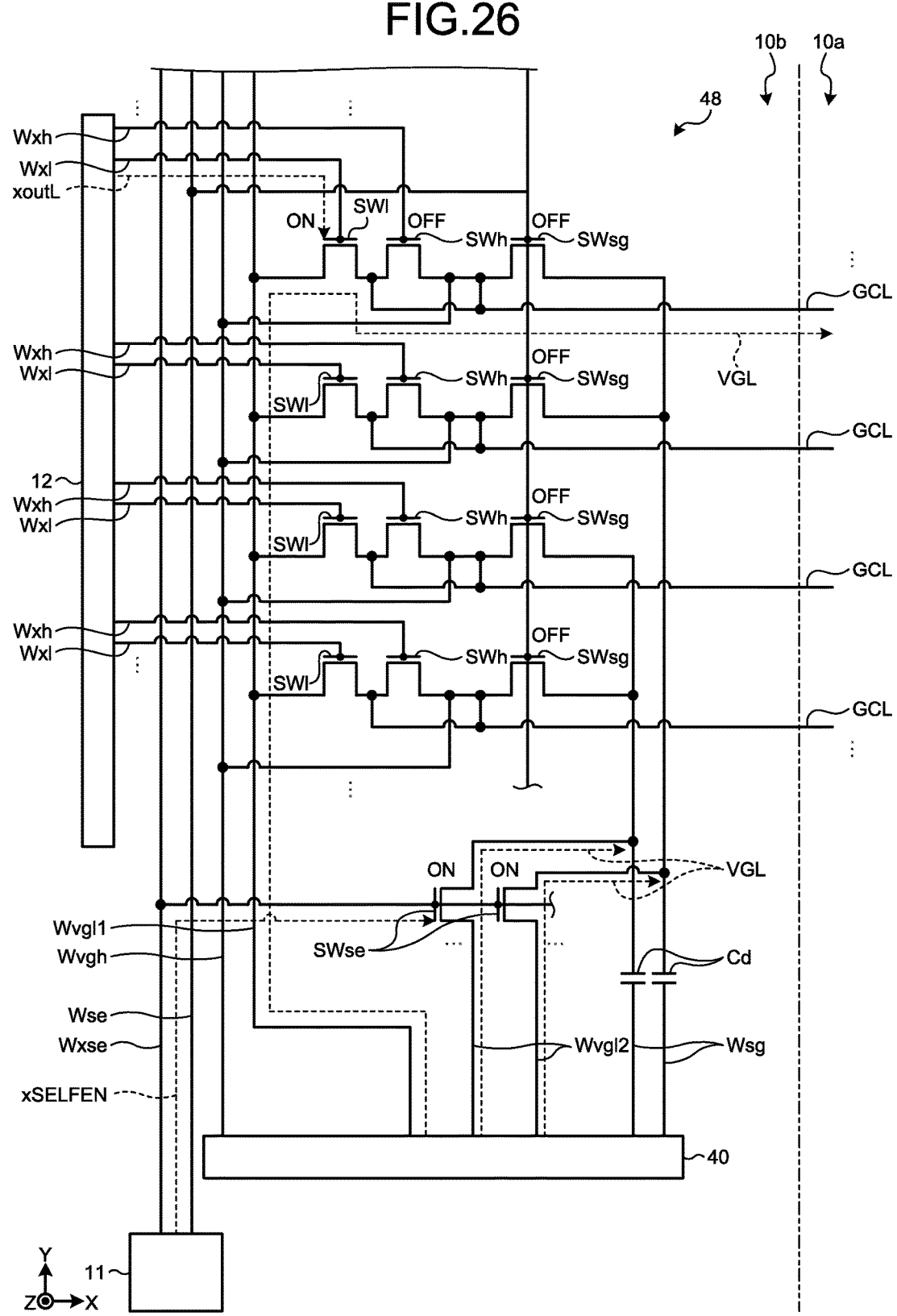
FIG. 26 is a schematic diagram illustrating an exemplary operation performed by the display apparatus with a touch detection function according to the first embodiment in a touch detection period.
Figure 27:
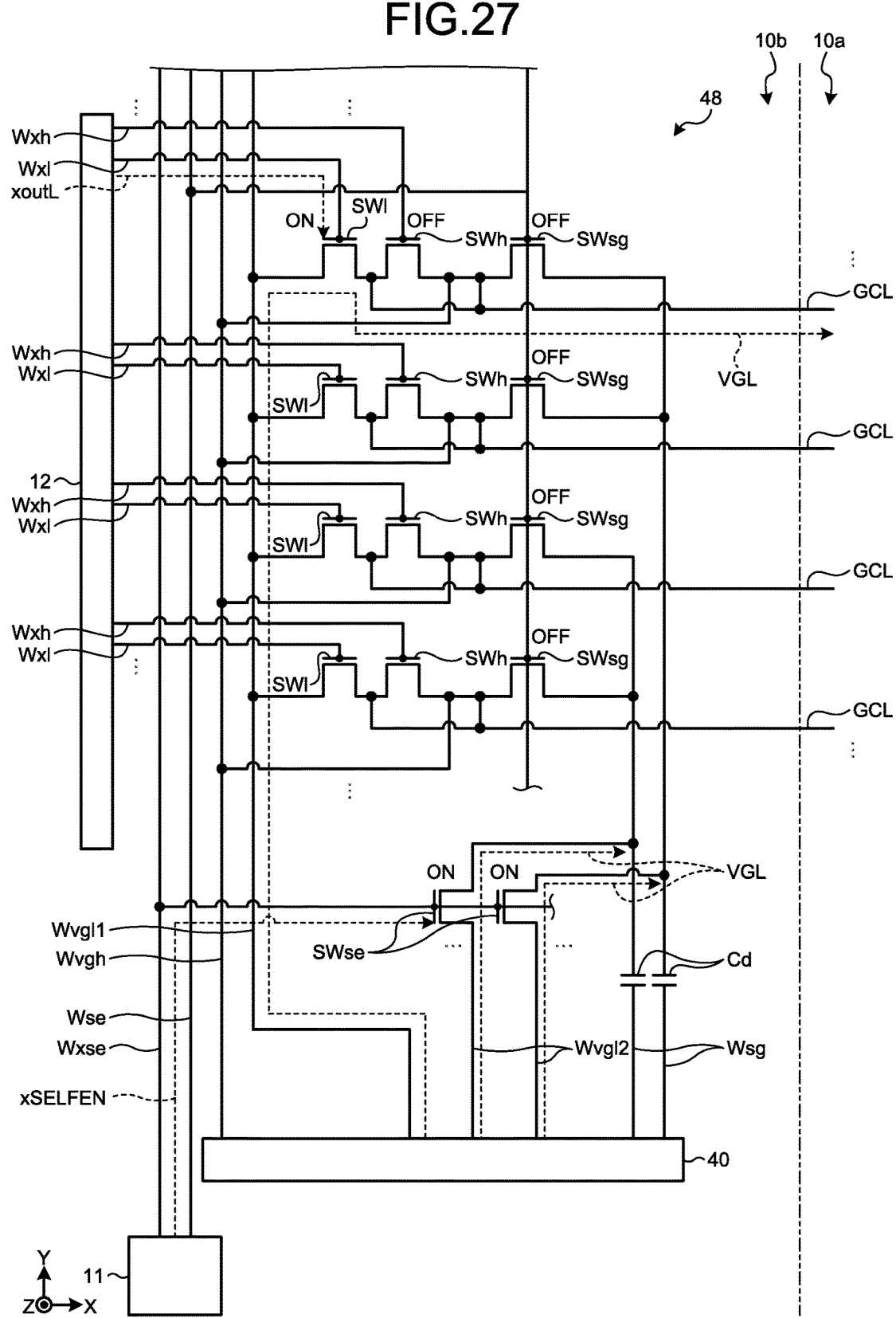
FIG. 27 is a schematic diagram illustrating an exemplary operation performed by the display apparatus with a touch detection function according to the first embodiment in a force detection period.
Figure 28:
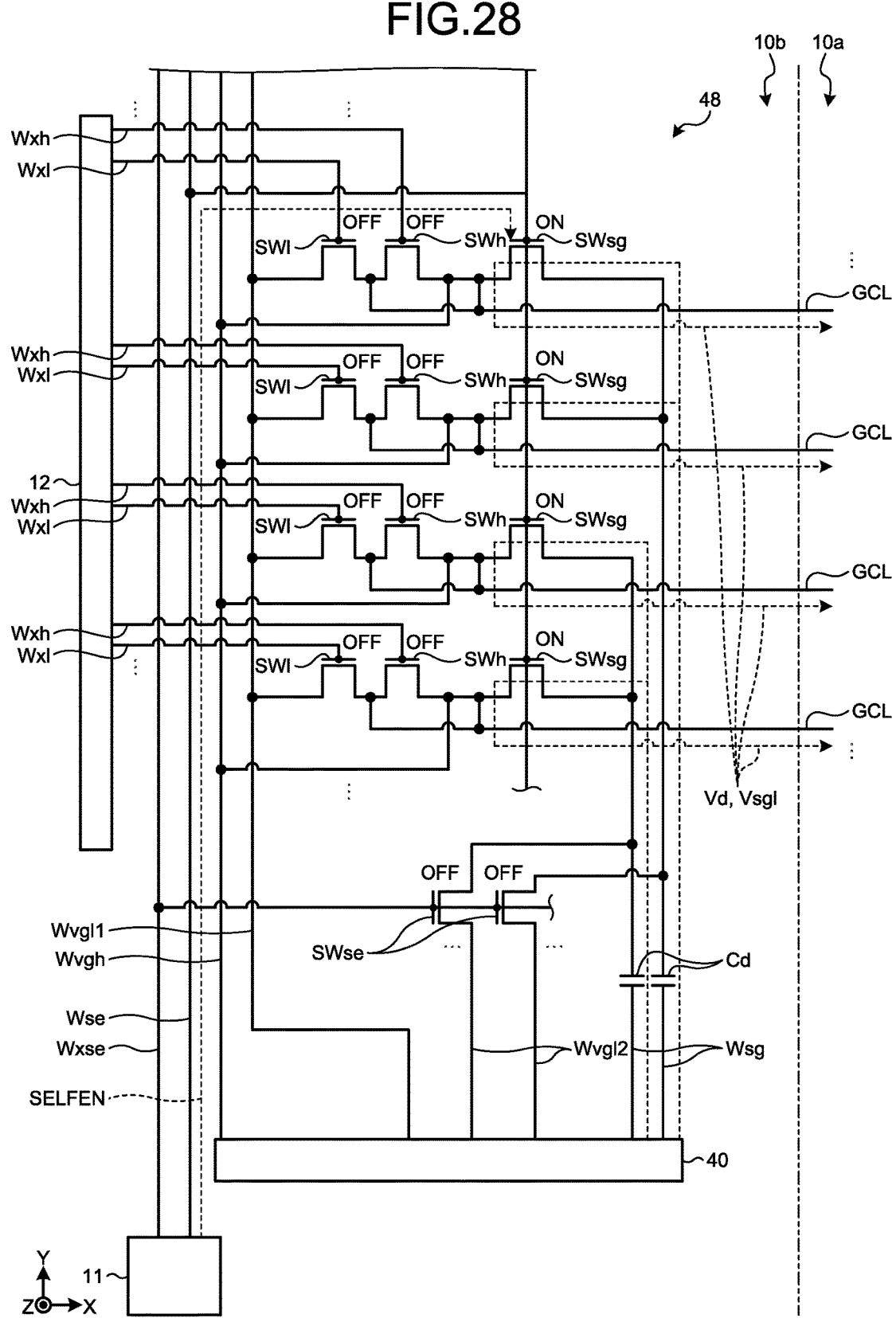
FIG. 28 is another schematic diagram illustrating an exemplary operation performed by the display apparatus with a touch detection function according to the first embodiment in the force detection period.

FIG. 23 and FIG. 24 are timing waveform charts each illustrating an exemplary operation of the display apparatus with a touch detection function according to the first embodiment. FIG. 25 is a schematic diagram illustrating an exemplary operation performed by the display apparatus with a touch detection function according to the first embodiment in a display period. FIG. 26 is a schematic diagram illustrating an exemplary operation performed by the display apparatus with a touch detection function according to the first embodiment in a touch detection period. FIG. 27 is a schematic diagram illustrating an exemplary operation performed by the display apparatus with a touch detection function according to the first embodiment in a force detection period. FIG. 28 is another schematic diagram illustrating an exemplary operation performed by the display apparatus with a touch detection function according to the first embodiment in the force detection period.

As an example of the method for operating the display apparatus 1 with a touch detection function, the display apparatus 1 with a touch detection function performs the touch detection operation (in a touch detection period), the display operation (in a display operation period), and the force detection operation (in a force detection period), in a time division manner. The touch detection operation, the force detection operation, and the display operation may be performed in any manner as long as being performed separately. The following describes a method for performing each of the touch detection operation, the display operation, and the force detection operation multiple times, in one frame period (1F) of the display panel 20, i.e., during time required to display video information for one screen.

As illustrated in FIG. 23, when a control signal (TS-VD) is turned ON (high level), one frame period (1F) is started. A control signal (TS-HD) is repeatedly turned ON (high level) and OFF (low level) during the one frame period (1F). The touch detection operation or the force detection operation is executed in a period when the control signal (TS-HD) is turned ON, and the display operation is executed in a period when the signal (TS-HD) is turned OFF. The control signal (TS-VD) and the control signal (TS-HD) are output in accordance with a clock signal from a clock generator of the controller 11 (see FIG. 1). A plurality of display operation periods Pdx (x=1, 2, ..., n), a plurality of touch detection periods Ptx (x=1, 2, ..., m) in which the touch detection operation is performed, and a plurality of force detection periods Pf1, Pf2, and Pf3 in which the force detection operation is performed constitute the one frame period (1F). These periods are alternately arranged on a time base in the order of the touch detection period Pt1, the display operation period Pd1, the touch detection period Pt2, the display operation period Pd2 .... For example, the display operation period Pdx is longer than any of the touch detection periods Ptx, the force detection period Pf1, and the force detection period Pf2.

The controller 11 supplies the video signals Vdisp to the pixels Pix (see FIG. 15) in a plurality of rows selected in each display operation period Pdx through the gate driver 12 and the source driver 13 in the display operation periods Pdx (x=1, 2, ..., n). FIG. 23 illustrates selection signals (SELR/G/B) for selecting the three colors, i.e., R, G, and B, and a video signal (SIGn) of each color. A corresponding sub-pixel SPix is selected according to the selection signal (SELR/G/B), and the video signal (SIGn) of each color is supplied to the selected sub-pixel SPix, so that the display operation of an image is executed. In each display operation period Pdx, an image obtained by dividing video signals Vdisp for one screen by n is displayed, and the video information of the one screen is displayed in the display operation periods Pd1 to Pdn. The first sensor electrodes COML also function as the common electrodes of the display panel 20. In each of the display operation periods Pdx, the ground potential GND is supplied to the first sensor electrodes COML.

In each of the display operation periods Pdx, the gate driver 12 sequentially outputs a control signal xoutH to each one of the wires Wxh, as illustrated in FIG. 25. The control signal xoutH turns ON the switch SWh. Consequently, the on-voltage VGH is supplied to the corresponding gate line GCL from the detector 40 through the wire Wvgh and the corresponding switch SWh. The on-voltage VGH turns ON the corresponding switch SWp.

In each of the display operation periods Pdx, the gate driver 12 sequentially outputs a control signal xoutL to each one of the wires Wx1, as illustrated in FIG. 26. The control signal xoutL turns ON the switch SW1. Consequently, the off-voltage VGL is supplied to the corresponding gate line GCL from the detector 40 through the wire Wvgl1 and the corresponding switch SW1. The off-voltage VGL turns OFF the corresponding switch SWp.

In each of the display operation periods Pdx, the controller 11 outputs a control signal xSELFEN to the wire Wxse as illustrated in FIG. 25 and FIG. 26. The control signal xSELFEN turns ON the switches SWse. Consequently, a signal (first signal) having the off-voltage VGL (first voltage) is supplied to the wires Wsg through the wires Wvgl2.

In each of the touch detection periods Ptx (x=1, 2, ..., m), the controller 11 outputs a control signal to the first sensor driver 14. The first sensor driver 14 supplies a detection drive signal Vcom for touch detection to the first sensor electrodes COML. Specifically, as illustrated in FIG. 24, in each one of the touch detection periods Ptx, the detection drive signal Vcom is supplied to one supply unit of COMLx (x=1, 2, ..., m) in the first sensor electrodes COML. Based on the basic principle of the mutual capacitive touch detection described above, the detector 40 detects whether there is a touch input to the display region 10a from the first detection signal Vdet1 supplied from the second sensor electrode TDL, and calculates the coordinates of the input position.

In each of the touch detection periods Ptx, the detector 40 supplies the off-voltage VGL to the wire Wvg1 as illustrated in FIG. 27. The gate driver 12 sequentially outputs a control signal xoutL to each one of the wires Wx1. The control signal xoutL turns ON the switch SW1. Consequently, the off-voltage VGL is supplied to the corresponding gate line GCL from the detector 40 through the wire Wvg1 and the corresponding switch SW1.

In each of the touch detection periods Ptx, the controller 11 outputs the control signal xSELFEN to the wire Wxse as illustrated in FIG. 27. The control signal xSELFEN turns ON the switches SWse. Consequently, the off-voltage VGL is supplied to the wires Wsg through the wires Wvgl2.

In the force detection period Pf1, the controller 11 outputs a control signal to the second drive signal generator 15. The second drive signal generator 15 supplies the detection drive signal Vd to the first sensor electrodes COML as illustrated in FIG. 24. Based on the above-described self-capacitive detection principle, the detector 40 calculates force input to the input surface 101a (see FIG. 11, for example) from the second detection signal Vdet2 supplied from the first sensor electrodes COML.

In the force detection period Pf1, the controller 11 outputs a control signal SELFEN to the wire Wse as illustrated in FIG. 28. The control signal SELFEN is an inversion signal of the control signal xSELFEN and turns ON the switches SWsg. In the force detection period Pf1, the detector 40 outputs the guard signal Vsg1 to the wires Wsg. Consequently, in the force detection period Pf1, the guard signal Vsg1 is supplied to the gate lines GCL as illustrated in FIG. 24. The guard signal Vsg1 is preferably a signal having an amplitude that fluctuates in synchronization with the detection drive signal Vd and having a waveform of the same amplitude and the same frequency as those of the detection drive signal Vd, but may have a different amplitude. The detection drive signal Vd is a pulse signal equivalent to the alternating-current square wave Sg illustrated in FIG. 10.

In the force detection period Pf2, the controller 11 outputs the control signal SELFEN to the wire Wse as illustrated in FIG. 28, thereby turning ON the switches SWsg. In the force detection period PC, the detector 40 outputs the detection drive signal Vd to the wires Wsg. Consequently, in the force detection period PC, the detection drive signal Vd is supplied to the gate lines GCL as illustrated in FIG. 24. Based on the above-described self-capacitive detection principle, the detector 40 calculates force input to the input surface 101a (see FIG. 11, for example) from the third detection signals Vdet3 supplied from the gate lines GCL.

In the force detection period PC, the controller 11 outputs a control signal to the second drive signal generator 15. The second drive signal generator 15 supplies the guard signal Vsg1 to the first sensor electrodes COML as illustrated in FIG. 24.

In the force detection period Pf1 and the force detection period PC, the detector 40 supplies the guard signal Vsg1 to the shield SLsg as illustrated in FIG. 24. On the other hand, in each of the display operation periods Pdx and each of the touch detection periods Ptx, a signal (second signal) having a predetermined voltage (second voltage) is supplied to the shield SLsg. The second voltage is, for example, the ground potential GND. That is, the second voltage is equal to a voltage supplied to the first sensor electrodes COML serving as the common electrodes in the display operation periods Pdx.

As described above, the wires Wsg are arranged between the switches SWsg and the display region 10a so that the wires Wsg are close to the display region 10a (see FIG. 20). As illustrated in FIG. 25 to FIG. 27, the off-voltage VGL is supplied to the wires Wsg in the touch detection periods Ptx and the display operation periods Pdx. For this reason, the charged wires Wsg may possibly cause the alignment film formed of a polyimide film to be charged or cause ions in the liquid crystal layer 6 to be moved. Such charging of the alignment film or movement of ions in the liquid crystal layer 6 may possibly disturb video images displayed in the display operation periods Pdx.

On the other hand, the display apparatus 1 with a touch detection function includes the shield SLsg, and thus can prevent the wires Wsg from influencing display. That is, electric lines of force generated by the charged wires Wsg easily pass through the shield SLsg having the ground potential GND, and thus hardly reach the display region 10a. This configuration prevents influence of the wires Wsg on display.

Each one of the wires Wsg (see FIG. 20) may not necessarily be coupled to two of the gate lines GCL. For example, each one of the wires Wsg may be coupled to one of the gate lines GCL, or may be coupled to three or more of the gate lines GCL.

The off-voltage VGL may not necessarily be supplied to the gate lines GCL in each of the touch detection periods Ptx. For example, the detection drive signal Vcom may be supplied to the gate lines GCL in each of the touch detection periods Ptx. The gate lines GCL may be left in a floating state in which the potentials thereof are not fixed without any voltage supplied thereto.

In the force detection period Pf1, the source lines SGL may serve as the detection electrodes in substitution for the first sensor electrodes COML. That is, in the force detection period Pf1, the second drive signal generator 15 may supply the detection drive signal Vd to the source lines SGL. The display apparatus with a touch detection function performs force detection using the gate lines GCL and wires intersecting the gate lines GCL and grade-separated from the gate lines GCL in the display region 10a (for example, the first sensor electrodes COML or the source lines SGL).

In the display operation periods Pdx, the predetermined voltage (second voltage) supplied to the shield SLsg may not necessarily be the ground potential GND. The second voltage is preferably different from the off-voltage VGL and the on-voltage VGH to be supplied to the switches SWp. The second voltage is preferably different from a predetermined voltage (first voltage) supplied to the wires Wsg in the display operation periods Pdx. The first voltage may not necessarily be the off-voltage VGL. The second voltage is preferably equal to a voltage supplied to the common electrodes (first sensor electrodes COML) in the display operation periods Pdx.

The shield SLsg may not necessarily overlap all of the wires Wsg. The shield SLsg may overlap at least one of the wires Wsg. When the shield SLsg overlaps a part of the wires Wsg, the shield SLsg preferably overlaps one or some of the wires Wsg that is closer to the display region 10a than the rest of the wires Wsg. That is, the shield SLsg preferably overlaps one of the wires Wsg that is the closest to the display region 10a among all of the wires Wsg. An element that supplies the guard signal Vsg1 to the shield SLsg may not necessarily be the detector 40. The element is not specifically limited and may be another driver IC or the like different from the detector 40. The metal members SLm may not necessarily be provided on a surface of the shield SLsg on the side thereof facing the wires Wsg. For example, the metal members SLm may be provided on a surface of the shield SLsg on the side thereof not facing the wires Wsg.

The shield SLsw and the shield SLsg may be integrally formed. The shield SLsw and the shield SLsg may not necessarily be arranged in the same layer as that of the first sensor electrodes COML in the display region 10a. For example, the shield SLsw and the shield SLsg may be arranged in the same layer as that of the pixel electrodes 22.

As described above, a display apparatus (the display apparatus 1 with a touch detection function) according to the present embodiment includes the gate lines GCL, first switches (the switches SWp), second switches (the switches SWsg), and first wires (the wires Wsg). The first switches (the switches SWp) are arranged in the respective pixels Pix in the display region 10a and are coupled to the respective gate lines GCL. The second switches (the switches SWsg) are arranged in a frame region 10b surrounding the display region 10a and are coupled to the respective gate lines GCL. The first wires (the wires Wsg) are coupled to the second switches (the switches SWsg) and are configured to supply first detection drive signals (the detection drive signals Vd) to the gate lines GCL through the second switches (the switches SWsg) in the detection operation periods. The first wires (wires Wsg) are arranged between the second switches (switches SWsg) and the display region 10a.

This configuration makes the gate lines GCL grade-separated from the first wires (wires Wsg). When the detection electrodes are driven by the self-capacitive method, the first wires (wires Wsg) and the gate lines GCL are at the same potential. Consequently, the display apparatus (display apparatus 1 with a touch detection function) can prevent generation of a parasite capacitance in the self-capacitive detection operation, and also prevent slowdown of the detection.

The display apparatus (display apparatus 1 with a touch detection function) according to the present embodiment includes the gate lines GCL, the first wires (wires Wsg), and a shield (the shield SLsg). The first wires (wires Wsg) are arranged in the frame region 10b surrounding the display region 10a and are configured to supply the detection drive signals Vd to the gate lines GCL in the detection operation periods and be supplied with first signals having a predetermined first voltage (the off-voltage VGL) in the display operation periods that are different from the detection operation periods. The shield (the shield SLsg) is a conductive member overlapping at least one of the first wires (wires Wsg) when viewed in a direction (the Z direction) perpendicular to the display region 10a and is supplied with second signals having a predetermined second voltage (the ground potential GND) in the display operation periods.

As a result, the shield (shield SLsg) serving as a conductive member covers at least one or some of the first wires (first wires Wsg), whereby the charged first wires (first wires Wsg) are less likely to influence the display region 10a. The display apparatus (display apparatus 1 with a touch detection function) thus can prevent influence on display by the wires to be supplied with the detection drive signals in the self-capacitive detection operation.

The shield SLsg has the ground potential GND, whereby in the display operation periods, the electric lines of force generated by the charged first wires (wires Wsg) easily pass through the shield (shield SLsg) having the ground potential GND, and thus hardly reach the display region 10a. Therefore, the display apparatus (display apparatus 1 with a touch detection function) can prevent influence on display by the wires to be supplied with the detection drive signals in the self-capacitive detection operation.

Second Embodiment

Figure 29:
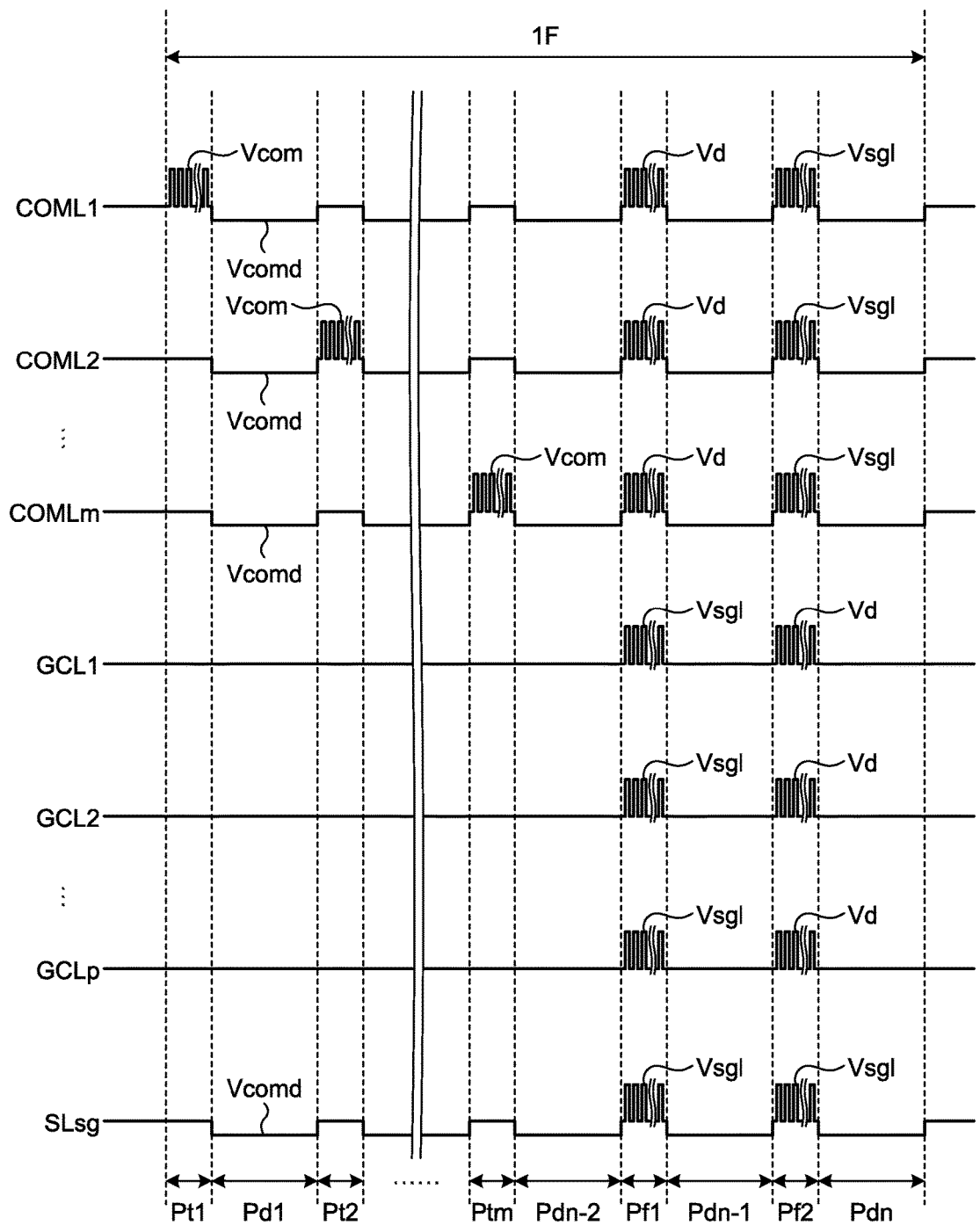
FIG. 29 is a timing waveform chart illustrating an exemplary operation of a display apparatus with a touch detection function according to a second embodiment.

FIG. 29 is a timing waveform chart illustrating an exemplary operation of a display apparatus with a touch detection function according to a second embodiment. In the second embodiment, a first sensor driver 14 supplies a voltage Vcomd to all of first sensor electrodes COML in display operation periods Pdx.

As illustrated in FIG. 29, in the display operation periods Pdx, a predetermined voltage (second voltage) to be supplied to a shield SLsg is a voltage Vcomd. That is, the second voltage is equal to a voltage supplied to the first sensor electrodes COML operating as common electrodes in the display operation periods Pdx.

The present invention can naturally provide other advantageous effects that are provided by the aspects described in the embodiments above and are clearly defined by the description in the present specification or appropriately conceivable by those skilled in the art.

What is claimed is:
1. A display apparatus comprising:
a plurality of gate lines;
a plurality of first switches arranged in respective pixels in a display region, each of the first switches being coupled to one of the gate lines;
a plurality of second switches arranged in a frame region surrounding the display region, each of the second switches being coupled to one of the gate lines;
a first wire coupled to the respective second switches and supplying a detection drive signal to the respective gate lines through the respective second switches in a detection operation period;
a third switch arranged in the frame region and coupled to the first wire; and
a second wire coupled to the third switch and supplied with an off-state voltage,
wherein the first wire is arranged between the second switches and the display region, and
the off-state voltage of the first switches is supplied to the first wire in a display operation period different from the detection operation period.
2. The display apparatus according to claim 1, wherein the first wire is grade-separated from the gate lines in the frame region.
3. The display apparatus according to claim 1, wherein the first wire is coupled to two or more of the gate lines through the respective second switches.
4. The display apparatus according to claim 1, wherein the first wire is one of a plurality of first wires, and
the second switches and the first wires are provided on two opposite sides of the display region.
5. The display apparatus according to claim 1, wherein the first wire also serves as an output wire for a detection signal output from the gate lines.
6. A display apparatus comprising:
a plurality of gate lines;
a plurality of first switches arranged in respective pixels in a display region, each of the first switches being coupled to one of the gate lines;
a plurality of second switches arranged in a frame region surrounding the display region, each of the second switches being coupled to one of the gate lines;
a first wire coupled to the respective second switches and supplying a detection drive signal to the respective gate lines through the respective second switches in a detection operation period; and
a plurality of intersecting wires grade-separated from the gate lines in the display region, and supplied with the detection drive signal in the detection operation period, wherein
the first wire is arranged between the second switches and the display region, and
in a period when the detection drive signal is supplied to the intersecting wires, a guard signal is supplied to the gate lines through the first wire.
7. The display apparatus according to claim 6, further comprising a detector configured to detect force based on detection signals output from the gate lines.

* * * * *